United States Patent [19]

Titterton et al.

[11] Patent Number: 4,995,101
[45] Date of Patent: Feb. 19, 1991

[54] SECURE TWO-WAY COMMUNICATIONS WITH SUBMERGED SUBMARINES

[75] Inventors: Paul J. Titterton, Palo Alto; Frederick Martin, Menlo Park; Dan J. Radecki, San Jose; Robert W. Cotterman, Rocklin, all of Calif.

[73] Assignee: GTE Government Systems Corporation, Mountain View, Calif.

[21] Appl. No.: 409,208

[22] Filed: Sep. 19, 1989

[51] Int. Cl.⁵ .......................................... H04B 10/00
[52] U.S. Cl. ................................. 455/607; 455/617; 342/45
[58] Field of Search ............... 455/604, 605, 606, 607, 455/617; 342/45

[56] References Cited

U.S. PATENT DOCUMENTS 4,764,982  8/1988  Pfund .................................. 455/606
4,829,597  5/1989  Gelbwachs ....................... 455/617

OTHER PUBLICATIONS

Laser Focus World, "Titanium Sapphire's Star Rises" by Yvonne A. Carts, Sep. 1989, pp. 73–88.
Milcom 87 Proceedings, "Atomic Resonance Filter Optical Receiver (ARFORM) Module", by Paul Titterton & James F. Shaw, No. 25.1, 10/21/87.
IEEE Journal of Quantum Electronics, "Atomic Resonance Filters" by J. A. Gelbwachs, vol. 24, No. 7, Jul. 1988, pp. 1266–1277.

Primary Examiner—Reinhard J. Eisenzopf
Assistant Examiner—Geoff Sutcliffe
Attorney, Agent, or Firm—Douglas M. Gilbert; John F. Lawlor

[57] ABSTRACT

A method of providing secure tactical communications between a submerged submarine and an airborne platform using a pulse-modulated blue-green laser beam. During an initial acquisition mode, the airborne transceiver sends out a downlink laser beam to the ocean surface and below using a predetermined IFF code to identify the transceiver to the submarine. In the preferred embodiment the transmit optics spread the beam out into an elongated elliptically-shaped pattern to maximize coverage of the search area. When the downlink beam energy is within range of the submarine, an optical receiver on the submarine detects the beam, filters out the background light with a very narrow-band filter, and converts the light pulses to equivalent electrical pulses. A signal processor in the submarine receiver decodes the electrical pulses and verifies the IFF code to prevent the submarine from responding to a laser beam from an unfriendly source. If the IFF is verified, the submarine laser transceiver transmits a pulse-modulated uplink beam response at the same wavelength, but timed so that the light pulses are time interleaved with the downlink pulses. The uplink beam power is carefully controlled to the minimum power level required by the airborne receiver to recover the uplink beam. As soon as the airborne receiver verifies the uplink IFF code, communications begin over the laser link for the duration of time that the airborne platform receiver is within range of the uplink beam. In one embodiment of this invention, both receivers employ a Cesium filled atomic resonance filter (ARF) to separate the blue-green beam from any background light.

44 Claims, 13 Drawing Sheets

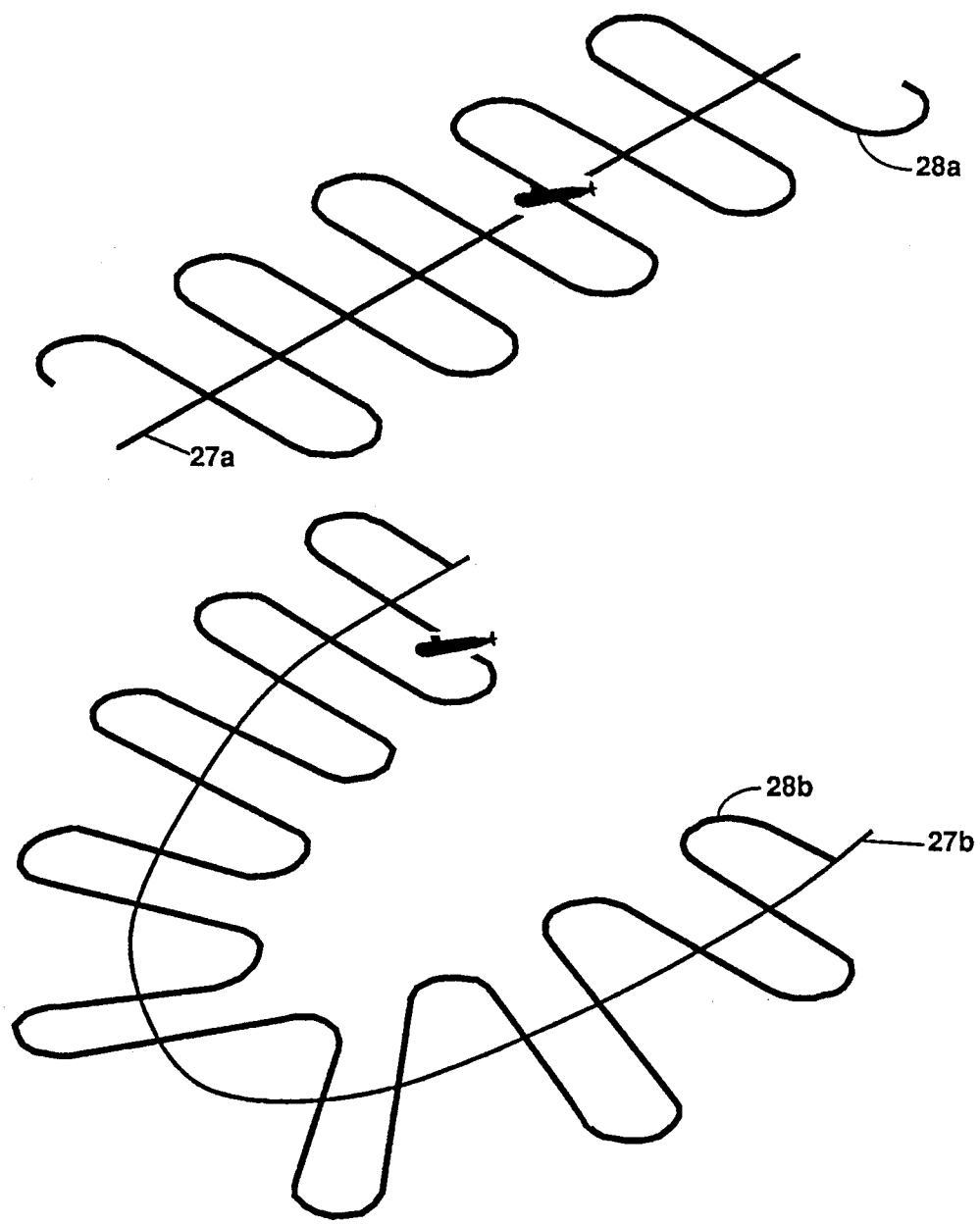
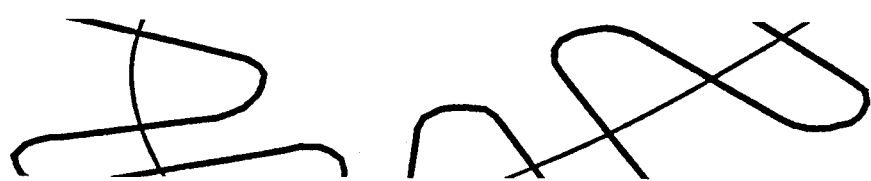
FIG. 7

FIG. 12 - PPM Decode Algorithm

SECURE TWO-WAY COMMUNICATIONS WITH SUBMERGED SUBMARINES

BACKGROUND OF THE INVENTION

1. Field of the Invention

The present invention relates to submarine laser communications (SLC), and more particularly to secure two-way communication techniques providing high quality communications in real time between an aircraft and submerged submarines at operational depths and speeds.

2. Description of the Prior Art

From the time that the first submarine slipped beneath the ocean surface, there has been a desire for two-way (duplex) communications with them. Since that first submarine, communication technologies have substantially improved basic submarine communications; however, for various reasons no one system has been completely satisfactory. Current methods of communication generally require the submarine either to surface directly or to send a probe to the surface, neither of which is very desirable. Such action potentially exposes the submarine to its adversary, it limits the submarine's overall maneuverability when in use, and it detracts from the submarine's mission. Because a submarine is most vulnerable when it attempts to communicate, the present solution when far from home is basically no communication at all.

Of the present systems, one (known as an ELF system) uses an extremely-low frequency modulated carrier, and a second uses very-low frequency (VLF) carrier signals. The ELF system with transmitters in Wisconsin and Michigan uses the skin effect of the earth to send very high power signals to distant submarines at relatively shallow depths; however, the system is characterized by extremely low data rates (on the order of minutes per character), is unidirectional, is non-selective, and at present requires the submerged vessel to trail a long antenna wire to receive the signals. Its main advantage is that it is a completely covert system, i.e., secure), and a submerged submarine can receive ELF signals to depths of several hundred feet whether in open water or under an ice pack. The VLF system, unlike the ELF system, has usable data rates for message traffic delivery, but a communicating submarine must be close to the surface (within 10 meters) to receive a transmission. If the high-power shore-based antenna is inoperable, a transmitting airplane must trail a long antenna wire (the TACAMO system) to communicate over a significant ocean area. A submarine's vulnerability is increased during the period of communication. Like the ELF system, the VLF system provides only one-way communications. This combined with their low message delivery rate makes them undesirable for tactical operations.

Communication satellites have also been used (e.g. SSIXS) to provide a form of two-way communications with submarines. Such satellite systems overcome numerous shortcomings of the VLF and ELF systems, but suffer from the submarine's need to surface an antenna to communicate, which dictates that a submarine must be at least at periscope depth to communicate or float a buoy on the ocean surface. To minimize this period of vulnerability, a form of burst communication is utilized. Even with burst communication the potential for detection of the uplink remains high, and therefore, this technique does not offer truly covert operation. Other submarine communication systems use slot buoys having built-in UHF transmitters. The submarine releases the buoys underwater to float to the surface where a prerecorded message is then transmitted generally after a delay of many minutes. When the transmission is complete, the surface buoy self-destructs and sinks to the ocean bottom. As with the VLF and ELF systems, this method of communication is one-way and is often quite delayed to limit the exposure of the submarine. Both the releasable buoys and the satellite transmission suffer from the disadvantage of potentially revealing the approximate position of the submarine.

None of the aforementioned communication techniques has any IFF (identify, friend or foe) capability when the submarine is at operational depths and speed, and all of the transmissions can be intercepted and/or jammed by an adversary. The consequence of these limitations is that the submarine has limited utility for coordinated activities, and moreover, it must constantly be wary of being mistaken as an adversary by a member of its own naval group. In effect, present submarine communication systems inhibit the submarine from simultaneously performing its mission and communicating with its own naval group, which results in limiting the tactical missions of submarines.

Over the last 10 to 15 years various suggestions, studies and field experiments have been done to show the feasibility of using lasers of suitable wavelengths to communicate between submarines and aircraft and/or satellites. Blue or blue-green lasers have been chosen because light transmission through water is best at or near 490 nm. Transmission falls off rapidly below 400 nm and above 550 nm. Although satellite-to-submarine communications has been suggested (e.g., see U.S. Pat. No. 4,764,982), such systems are currently impractical using existing technology.

A tactical and covert two-way communications channel between an aircraft and a submarine operating at operational depths and speeds would provide: (1) very useful and timely information, for example, over-the-horizon target information; (2) coordination of ASH maneuvers between an aircraft and a submarine; and (3) coordination of a surface fleet and submarines in a direct or associated direct support role. A covert communications system would preferably include an IFF capability so that a submarine could identify itself to a supporting aircraft without revealing its location to an enemy, and the aircraft could positively identify the fleet submarine and eliminate the confusion between a friendly asset and an adversary.

This invention is directed to practical techniques for providing secure laser communications which overcomes these problems.

A general object of the invention is to provide a secure method of communicating with submerged platforms, such as submarines, and one that is capable of operating in all weather conditions.

A further object of this invention is the provision of a communicating technique that will allow two-way communications between an airborne platform and a submarine at operational depths and speeds.

SUMMARY OF THE INVENTION

In accordance with the teachings of the present invention, these and other objectives are achieved through a practical technique for providing secure two-way (duplex) communications between a submerged platform, such as a submarine, and an airborne platform travelling above the region of the submerged platform. Two transceivers are required: one in the submerged platform and one in the airborne platform, to effect the transmit and receive functions. Each transceiver has a pulse-modulated (blue-green) laser transmitter and a corresponding optical receiver for receiving and demodulating the pulse position modulated (PPM) blue-green beam. There are two modes of operation: an acquisition mode, during which the airborne platform searches for the location of the submerged submarine, and a communicating mode, during which duplex communication takes place between the airborne transceiver and the submerged transceiver. In the acquisition mode, the airborne transceiver transmits a downlink beam containing an IFF code and encoded supervisory data so that when the submarine transceiver receives the downlink beam it can verify the identity of the sender. The encoded supervisory data contains among other things path information for setting the output beam power from the submarine. The airborne transmitter has an optical scanner with variable beam divergence control to produce either a pushbroom beam or a spot beam. The pushbroom beam has an elongated elliptically-shaped cross-sectional pattern, whereas the spot beam is a narrower and circularly-symmetric beam which is deflected from side-to-side transverse to the direction of travel of the aircraft.

In one embodiment of this invention, both receivers employ an atomic resonance filter (ARF) to separate the blue-green beam from any solar background light. The receiver in the submerged platform normally is in a standby mode ready to receive a laser beam at the proper wavelength. When the downlink beam traverses a region of the ocean within range of the submerged optical receiver, it detects the beam and converts the light pulses to equivalent electrical pulses by passing the beam through an atomic resonant filter. A signal processor in the receiver performs the decoding of the PPM pulses and verifies the IFF code to prevent the submarine from responding to a laser beam from an unfriendly source even if at the correct wavelength. When verified a responsive uplink beam is transmitted at the same blue-green wavelength, but timed so that the light pulses are time interleaved with the downlink pulses. End coded in the uplink beam is an uplink IFF code to acknowledge receiving the downlink beam. The uplink transmit power is carefully controlled to the minimum power level required by the airborne receiver to just recover the uplink beam. The downlink supervisory data enable the underwater transmit controller to determine and adjust the desired minimum output beam power required. The airborne platform optically scans during the acquisition mode using a variable field of view to detect the presence of the uplink beam. When the airborne receiver detects the uplink beam, it filters the beam through a second atomic resonant filter and decodes the uplink information. As soon as the airborne receiver verifies the uplink IFF code, the acquisition handshake is complete and the system switches to the communication mode. At this point the airborne receiver optics lock onto the spatial location from which the uplink beam emanates and varies its field of view of maximum S/N. A correction signal related to the uplink S/N is added to the downlink supervisory data for encoding with messages that are conveyed for the duration of time that the airborne receiver is within range of the uplink beam.

BRIEF DESCRIPTION OF THE DRAWINGS

For a better understanding of the invention as well as other objects and further features thereof, reference is made to the following description which is to be read in conjunction with the accompanying drawings wherein:

FIG. 7 is a pictorial diagram illustrating the spot scan used in accordance with the present invention;

DETAILED DESCRIPTION OF THE INVENTION

Figure 1:
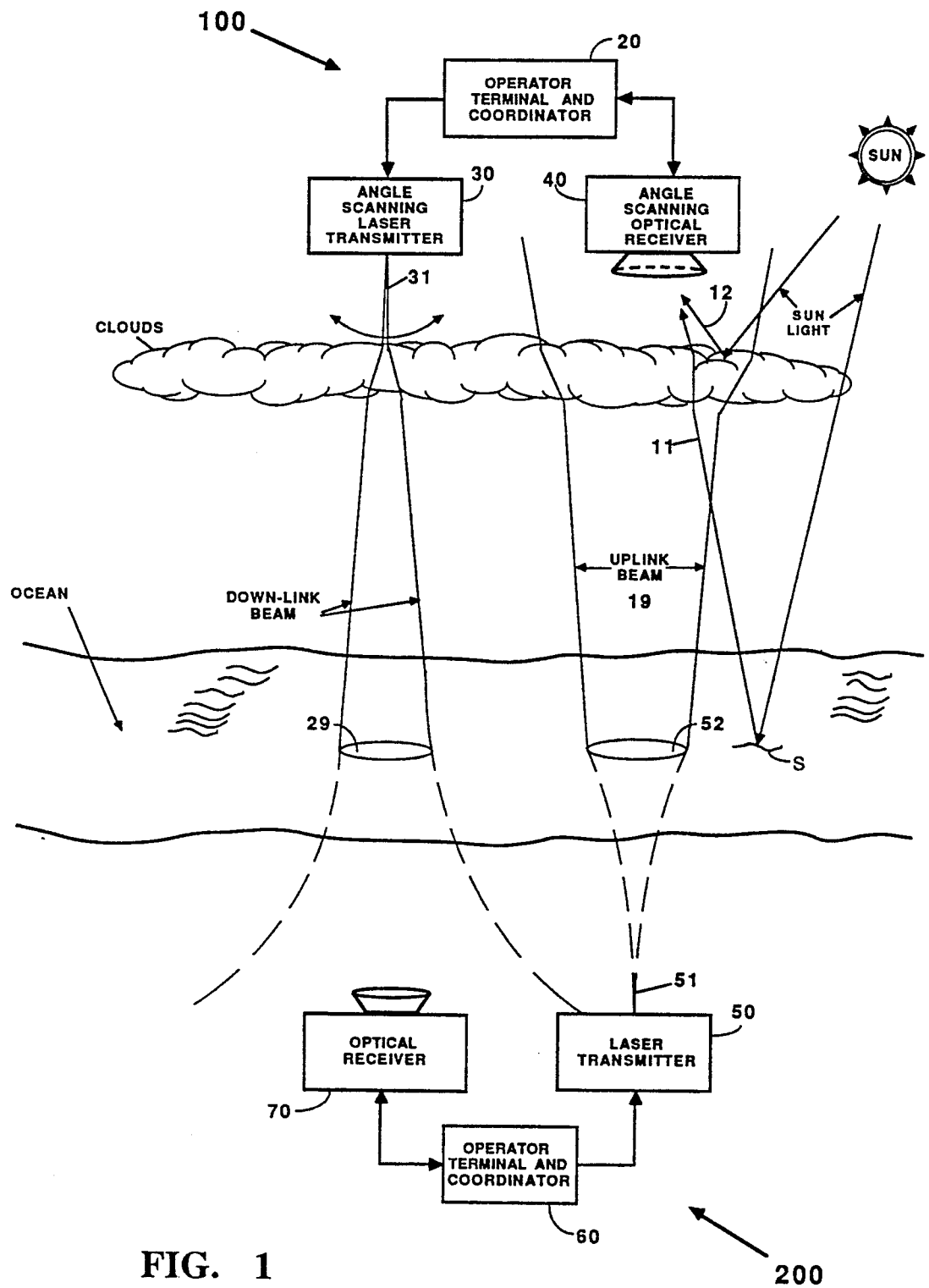
FIG. 1 is a pictorial diagram illustrating the basic elements of the communication system embodying the present invention.

For a better understanding of the subject invention, reference is made to the following description and to the above-described drawings. Referring to FIG. 1, depicted therein is a tactical airborne laser communication system (TALC) having a very narrow-band optical subsurface transceiver 200 and a very narrow-band optical airborne transceiver 100. The TALC system provides simultaneous two-way (duplex) communications between a submerged platform, such as a submarine, and an airborne platform, such as an aircraft, for the period of time the aircraft is within communicating range of the submarine. FIG. 1 illustrates various general aspects and environmental conditions in which the invention is intended to typically operate; however, the scale is distorted for illustrative purposes. The uplink and downlink laser beams are intentionally shown with separate paths, yet in actual operation the geometry of the transceivers and their platforms is such that the two beams substantially overlap the same physical space for some portion of the communication period. Because the two laser beams have the same optical wavelengths in the preferred embodiment, the two beams are time interleaved to avoid optical interference.

Airborne transceiver 100 consists of an operator control terminal 20, an angle-scanning pulse-modulated laser transmitter 30 and a scanning and signal processor 40. Subsurface transceiver 200 consists of an operator control terminal 60, a pulse-modulated laser transmitter 50 and an optical receiver and processor 70. As shown in FIG. 1, airborne transceiver 100 is typically carried by an aircraft travelling up to a few hundred miles per hour above the clouds while transceiver 200 is intended to be carried on a submerged platform, i.e., a submarine whose motion is insignificant relative to the motion of the aircraft. The preferred location of the optics portion of transceiver 200 is exterior to the pressure hull, while the message processing portion is interior to the hull. This preferred arrangement maintains the structural integrity of the submarine while allowing the desired communications between the airborne transceiver 100 and the subsurface transceiver 200. The airborne laser transmitter 30 and the airborne optical receiver and signal processor 40 are both preferably located in external stores, while the operator control terminal 20 is preferably located inside the aircraft if an operator is present.

All communications in the practice of the preferred embodiment of the invention originate with the airborne transceiver 100 to ensure a low probability of intercept (LPI) of the uplink beam, i.e; covertness, and to avoid revealing the submarine's general location. Although there is nothing inherent in the system design which would preclude communication being initiated from the submarine, this is not preferable for maintaining a maximum level of underwater platform security. Therefore, an operator in the airborne transceiver 100 or a command from a remote source always initiates the communications by activating the laser 33 from terminal 20. Initiating the link from the submerged platform unnecessarily subjects the submarine to possible detection by an unfriendly craft above the surface because, in general, the submarine operator has little or no apriori knowledge of the friendly craft's presence or of the presence or identity of other vessels or aircraft that may be operating in the same general area.

Airborne transceiver 100 has two modes of operation: an acquisition (or search) mode and a communication mode. Initially the airborne platform must go through an acquisition (search) procedure to locate the desired submarine, or more precisely for the submarine to detect and respond to an airborne transmit (call-up) signal. In some cases this might be nothing more than the aircraft travelling to a specific location over the ocean at a particular time, since in some cases with prior coordination the captain of the airborne platform may have knowledge of the exact location of the submarine. In other situations the captain of the airborne platform has no idea of the exact location of the submarine and must search for its location. An operator on the platform activates transceiver 100 at operator terminal 20 causing laser transmitter 30 to commence transmitting encoded laser pulses which initially contain only IFF and supervisory information. While platform 100 cruises above the clouds, transmitter 30 scans laser beam 31 in a predetermined pattern, and the scanning receiver 40 scans from side-to-side (lateral to the flight path) sensing for an uplink response during time periods which avoid scattered/reflected transmit pulses 31. The pulsed laser beam 31 propagates downward through the clouds and illuminates an area 29 on the ocean surface thousands of feet below the platform. Although FIG. 1 illustrates the downlink beam in a substantially vertical orientation, beam 31 must be either spread or scanned over a broad swath during the acquisition mode. The beam size, shape, power and scan rate are controlled according to the airplane's ground speed and altitude above the clouds to ensure complete coverage of the ocean out to a predetermined swath width. Once the laser beam enters the ocean water, it is greatly attenuated by virtue of the scattering and adsorption due to water molecules and impurities in the water. Approximately thirty meters below the surface, diffuse attenuation eliminates any directionality of the downlink beam, and as the beam descends in the water it spreads as generally shown in FIG. 1. From the surface of the water downward, the light rapidly dissipates, and only a small portion of the transmitted signal ever reaches optical receiver 70. The maximum submarine depth at which two-way communication can be established and maintained varies with a number of factors including but not limited to the output power of the transmitter, the degree of beam spreading introduced by the optics in the transmitter, the extent of cloud cover, the cruising altitude of the platform 100, whether the transmission occurs during the daytime or at night, and the optical wavelength selectivity and throughput of the receiver. Generally the maximum two-way communicating depth is limited by the uplink beam power, since reflected sunlight 11 and 12 is a more dominant noise factor in the airborne receiver 40 attempting to detect the uplink beam 19 than is the sunlight at the submerged submarine receiver 70 in attempting to detect the downlink beam.

Submarine transceiver 200 functions in a manner similar to that of airborne transceiver 100, except as stated above, the submarine communications operator does not normally initiate the communications, meaning that laser transmitter/modulator 50 is kept in a standby (warm) mode while receiver 70 is constantly operating to pick up a properly coded downlink beam. When transceiver 200 is within range of downlink light swath 29, optical receiver 70 senses the pulsed light by separating it from unwanted background sunlight, if present, decoding the modulated light pulses and transferring the coded message or IFF data to terminal 60 for analysis and interpretation. Before an acknowledgement response is sent, terminal 60 verifies the signal as coming from a friendly source and performs various signal processing functions to recover pertinent link information which the downlink signal 31 advantageously has encoded into the supervisory portion of the downlink signal. For example, beam 30 may contain downlink power information, scan mode, scan angle, altitude, the extent of cloud cover or weather information, and other useful information related to the transmission parameters and airborne receiver sensitivity of the communication link. Once the IFF code is verified, the submarine terminal 60 responds to the received message by activating the submarine laser transmitter 50 which transmits an appropriate acknowledgement in the form of a pulsed response (i.e., a "handshake") using the minimum power level determined by receive processor 70. Neither the submarine receiver 70 nor the submarine transmitter 50 have scanners but transmitter 50 may include a beam divergence control for shallow water-clear weather operation for reasons which will be explained later. In the uplink beam 19 the encoded coherent light pulses 51 from the submarine transmitter 50 propagate upwardly through the water and into the atmosphere. Similar to the downlink propagation, the uplink beam 51 is greatly attenuated and diffused in the water due to scattering and absorption from the water molecules and from any suspended particles. As depicted in FIG. 1, by the time the laser beam 51 exits the water, the beam has spread from a pencil thin ray to a wide conical column of incoherent light 52. The uplink beam 19 spreads more slowly in the atmosphere, but again diffuses through any clouds. Assuming platform 100 is within range of the submarine transmitter beam 51, a portion of the uplink beam will be received by the scanning receiver 40 along with any sunlight (11 and 12), assuming daytime operation, reflecting off the clouds and the surface of the water S. The scanning receiver 40 having a variable field of view synchronously scans the ocean surface with the transmitter 30 to pick up the response uplink beam. When the scanning receiver 40 encounters the pulsed uplink beam 19, it ceases scanning and locks onto the beam to maintain contact as long as possible until the airplane cruises out of range. The scanning receiver 40 with its very narrow-band atomic resonance filter (ARF) separates the uplink light from the background light and decode the light pulse into a text message. This message is passed to the terminal 20 thus completing the two-way communication link from the airplane to the submarine. Once the acquisition handshake is complete, the system switches into the communicating mode and laser transmitters 20 and 50 immediately commence generating the encoded laser pulses containing the message information. Greater detail regarding the preferred system architecture (e.g. preferred type of modulation, scanning procedures, etc.) is discussed following an explanation of the preferred embodiment of transceivers 100 and 200.

Referring to the block diagram shown in FIG. 2, greater functional detail of the TALC transceiver 100 will now be described. Before the link is established, the pulse train containing precoded IFF and supervisory data exit the operator terminal/coordinator 20 and enter the transmitter controller and modulator 36 along with beam control information for setting the size, shape and power of the downlink beam. The controller and modulator 36 sets the beam divergence, using beam divergence controller 37, and the beam steering (or scanning pattern) via the controller unit 38. The controller and modulator 36 converts the IFF and supervisory data into a continuous string of time coded, pulse position modulated (PPM) pulses, including time synchronization pulses, which control the switching of the pulsed power supply 32. (Although other forms of pulse modulation could be used for this application, PPM has been selected for the preferred embodiment for a number of reasons. Other forms of pulse modulation, such as PAM and pulse duration modulation, are adversely affected by pulse stretching caused by cloud scattering and by path attenuation variations from pulse to pulse.) The pulsed power supply 32 powers the pulsed blue laser 33 which preferably has an output wavelength $\lambda_1$ of either 455 nm or 459 nm and a nominal output power of 0.25 to 1.0 joules/pulse. (By way of example, the pulsed laser may be a XeCl (uv) laser shifted using a Raman-shifting Pb-vapor cell at 459 nm, or a frequency doubled lamp pumped Ti:Sapphire laser at either wavelength. Such lasers are well known in the art, see *Laser Focus World*, "Titanium Sapphire's Star Rises" by Yvonne A. Carts, September 1989, pages 73–88.) These particular wavelengths were chosen for their excellent water propagation characteristics and to match the narrow passband of the atomic resonant filters 416 and 702. Although laser 33 is shown as a single element in FIG. 2, a plurality of similar laser devices may be used with combined outputs to increase the output power and to increase the reliability of the system. Because the passband of the atomic resonant filter is extremely narrow, in most cases some form of frequency locking device must be coupled to laser 33 and 503 to maintain the output laser frequency at the proper setting. There are several frequency stabilization techniques that could be used for this purpose; one of which uses the same type of atomic resonant filter used in the receiver as the transmitter frequency setting element. The pulsed power supplies 32 and 504 must be capable of charging and discharging into the pulsed lasers 33 and 503 at a maximum rate dictated by the minimum pulse spacing and/or dead time in the PPM format. In the preferred embodiment of this invention, cooling for the lasers 33 and 503 and power supply 32 is supplied by a cooling unit that is not illustrated in FIGS. 2 or 3. The average pulse repetition rate is nominally 40 Hz.

As was stated previously in the preferred embodiment, both uplink and downlink beams 51 and 31 operate at the same wavelength (455 nm). At the present time there has been only one practical atomic resonant filter design that has sufficient sensitivity and background rejection to operate in the subject communication system. It has a cesium cell with a 455 nm (or 459 nm) absorption line. Therefore, even though a frequency diversity system would operate at a higher data rate, we employ the same frequency in both directions in the preferred embodiment of this invention to take full advantage of the properties of the atomic resonant filter. It is possible with existing technology to operate a frequency diversity system (455 nm up and 532 nm down) using a different type of receive filter in the downlink, such as a birefringent filter. Even though the Q of such a filter is not nearly as high as an atomic resonant filter, system performance may be acceptable if this type filter is used in the more robust downlink. Alternatively, the output power of transmitter 30 could be increased to compensate for a less sensitive submarine receiver.

The pulsed blue light, matching the wavelength of the atomic resonance filter 702 in the submarine receiver (FIG. 3), emerges from the laser 33 and enters a set of optics 34 which controls the size, shape and effective power of the laser beam. The beam-divergence controller 37 sets the downlink laser beam optics 34 in accordance with the instructions it receives from the transmit controller and modulator 36. The beam divergence setting determines the beam type and the transmitter beam area on the top of the clouds (or the ocean surface in clear weather). The output beam from the divergence optics 34 enters the two-axis gimbal optics 35 which steers beam 31 in response to commands from the beam steering controller 38. During the system acquisition mode, scan instructions direct the beam steering to cover the largest possible search area for the submarine consistent with submarine depth, environmental considerations, and submarine uncertainty area. The beam scan pattern for the two-axis gimbal 35 is generated by the beam steering controller 38 based upon the beam type information it receives from the operator/coordinator terminal 20 via the transmitter controller and modulator 36. The beam steering controller 38 and the two-axis gimbal 35 also compensate for the airplane's flight dynamics and instantaneous deviations to insure that beam 31 illuminates a contiguous area on the ocean without gaps in the coverage area. During the period when the communication link is established, permitting two-way communications, controller 38 causes the beam steering 35 to point the downlink beam on the ocean surface in the area from which the uplink beam emanates above the submarine.

The pulsed output beam 31 radiates from the airborne transceiver 100 and propagates downward illuminating the surface of the ocean and the subsurface region beneath swath 29 as described in FIG. 1. When the submarine transceiver 200 responds to the downlink message, the airborne receiver 40 looks for the uplink beam 19 from the submarine only during time periods when the downlink scattered/reflected output beam is not present. Some of the submarine's blue laser light 19, along with any solar background light (if present), enter the airborne scanning receiver through an optical window 421 in the aircraft's structure or alternatively in a pod attached to the plane.

The receiver's beam tracking controller 419 controls the scan pattern for the two-axis gimbal optics 420 on the airborne receiver 40. The field-of-view (FOV) controller 417 sets the FOV optics 418 to maximize the signal-to-noise ratio (S/N) of the uplink signal against the solar background. This maximum usually occurs when the field-of-view area matches the beam spot size on the ocean or on the cloud top. The gimbaled telescope 420 collects each optical pulse in the uplink beam 19, and FOV optics 418 passes the incoming light to ARF 416. Similar to the downlink receiver, ARF 416 absorbs the blue light from the laser and fluoresces red wavelength light. The very narrow fluorescent absorption resonance band of ARF 416, which is <0.0025 nm wide in the desired signal line and <0.010 nm in the total background line width, suppresses all the background light outside the absorption resonance region and absorbs the laser blue light to produce a high S/N even in the presence of strong sunlight. The temperature controller 415 maintains ARF 416 at a temperature setting which maximizes the sensitivity of the detector to achieve the maximum fluorescent conversion of the blue light to red light in ARF 416. The red light passes out the top (output) of ARF 416 and enters the red photomultiplier tube (PMT) detectors 414. (An alternate embodiment of detector 414 is an avalanche photodiode (APD) in place of the PMT's.) These detectors provide over 50 dB of gain and advantageously may operate for long periods in high levels of background light from reflected or direct sun light. The detected signals pass from the red detectors 414 to the pulse amplifier/pre-filter 412. The pulse amplifier/pre-filter 412 amplifies the incoming pulses, and discriminates against noise and non-classical background pulses, e.g. the occasional pulse signals from cosmic ray muons. The filtered signals pass to the signal processor and decoder 411 for decoding. Once the IFF code is verified, signal processor 411 produces plain text messages and passes them on to the operator terminal and IFF coordinator 20. This completes the two-way communication link. The receiver control processor 410 receives inputs from the operator terminal 20 which allows it to: set the AGC and threshold levels in the pulse amplifier/prefilter 412, adjust the high voltage and gain settings in the high voltage power supply 413 for the red detectors 414, adjust the temperature controller 415 to the temperature required by ARF 416, and vary the field-of-view controller 417 and the beam tracking controller 419. When a signal is detected by the signal processor and decoder 411, it alerts the receiver control processor 410. The control processor 410 switches the beam tracking controller 419 from the scanning acquisition mode to a tracking mode to maintain contact with the uplink signal for the duration of the message exchange between the aircraft and submarine. The nominal minimum connection time is 10 seconds for the pushbroom downlink beam and it may be 60 seconds or longer for a single pass of the airplane over the submarine, depending on the airborne platforms' altitude and other factors.

Referring to the block diagram shown in FIG. 3, greater detail of the submarine transceiver 200 will now be described. When the downlink beam 31 illuminates that region of the ocean where the submarine transceiver 200 is located, some of the downlink blue light 31 along with background light from the sun enters the submarine optical receiver 70 through a high-pressure optical window 701. As with the uplink receiver, ARF 702 separates the downlink blue laser light from the solar background. The blue signal light entering the ARF over a wide range of incident angles is converted to red light that passes out the bottom of the ARF 702 to enter the red PMT detectors 703. The red PMTs 703 provide 50 to 60 dB of signal gain and convert the entering light to an equivalent electronic pulse signal whose amplitude is proportional to the power of the entering light. The output signal on path 711 passes to the pulse amplifier/prefilter 704 which amplifies the incoming pulses and discriminates against noise and background pulses in the same manner as pulse amplifier/prefilter 412 in FIG. 2. The filtered signals pass to the signal processor and decoder 611 which decodes the detected downlink signals to produce the plain text messages for the operator terminal and IFF coordinator 60.

The control electronics 612 handles the general housekeeping requirements of the optical receiver 70. Controller 612 sets the AGC and threshold levels for the signal acquisition 704 and the red detector gain level by setting the high voltage power supply 706 and controls the temperature of ARF 702 depending upon parameters set by the operator terminal 60. By varying the temperature of ARF 702 it is possible to slightly vary the bandwidth of the filter.

Each optical receiver unit 701-707 is disposed in a single, high pressure canister 70 attached to the outside of the submarine's pressure hull to reduce space requirements inside and eliminate the need for an optical window through the submarine's pressure hull. The location of the transceiver electronics is a matter of convenience. The submarine may carry multiple receiver canisters 70 in order to provide redundancy and additional sensitivity.

The message signal passes into the signal processor and decoder 611 which for convenience resides inside the submarine's pressure hull. The decoded message is sent to the operator terminal and the IFF message control unit 60. Terminal 60, in combination with an operator, accepts the incoming message and formulates a response by setting up a string of coded pulses. When the downlink and uplink employ the same optical wave length, the pulse timing and power are coordinated with that of the incoming message pulses so that the uplink pulses are interleaved with downlink pulses to form the IFF code and prevent crosstalk within each transceiver. Operator control and monitoring of the receiver is handled by the receiver control processor 612. Prime power for the submarine transceiver comes from the vessel's prime power bus (not shown in FIG. 3).

The coded message from the operator terminal 60 is put into the PPM format by the transmitter controller and modulator 613. The controller and modulator 613 synchronizes the uplink PPM sequence with that of the downlink pulse sequence to interleave the uplink pulses with the downlink pulses; with proper encoding this establishes the IFF code sequence. The uplink sequence along with the desired uplink beam energy level, predicted from, among other factors the downlink signal strength, is passed to the control electronics 505. The control electronics 505 sets the mechanism that controls the uplink beam energy and triggers the pulse power supply 504 to fire the blue laser 503. The pulsed power supply 504, like its downlink counterpart 32, must be capable of recharging and discharging at a rate commensurate with the shortest intra-pulse spacing. The pulsed blue laser 503 is equivalent in wavelength and power to its downlink counterpart (shown in FIG. 2 as laser 33). By way of example, the pulsed laser 503 may be a XeCl (uv) laser shifted using a Raman-shifting Pb-vapor cell operating at 459 nm, or a frequency doubled Ti:Sapphire laser at 455 nm or 459 nm. The output laser pulse passes through the beam energy controller 502 which attenuates the output energy to a level controlled by the supervisory link data encoded into the downlink beam. The uplink energy level is controlled to reduce the possibility of detection by an adversary beyond the range required for communication with the friendly aircraft. In one embodiment, the uplink beam divergence may be controlled to provide sufficient uplink spatial spreading in shallow-water clear weather operation to eliminate beam steering due to air-water surface effects. Beam 51 emerges from the beam energy controller 502 and passes through a high pressure optical port 501. A cooling unit (not shown) cools laser 503 and power supply 504 and maintains constant temperature within the laser. Normally, transceiver 200 is maintained in a stand-by mode with receiver 70 always "looking" for a proper IFF downlink transmission, and laser transmitter 503 is always kept in a warm mode ready to respond in a matter of seconds.

Figure 3:
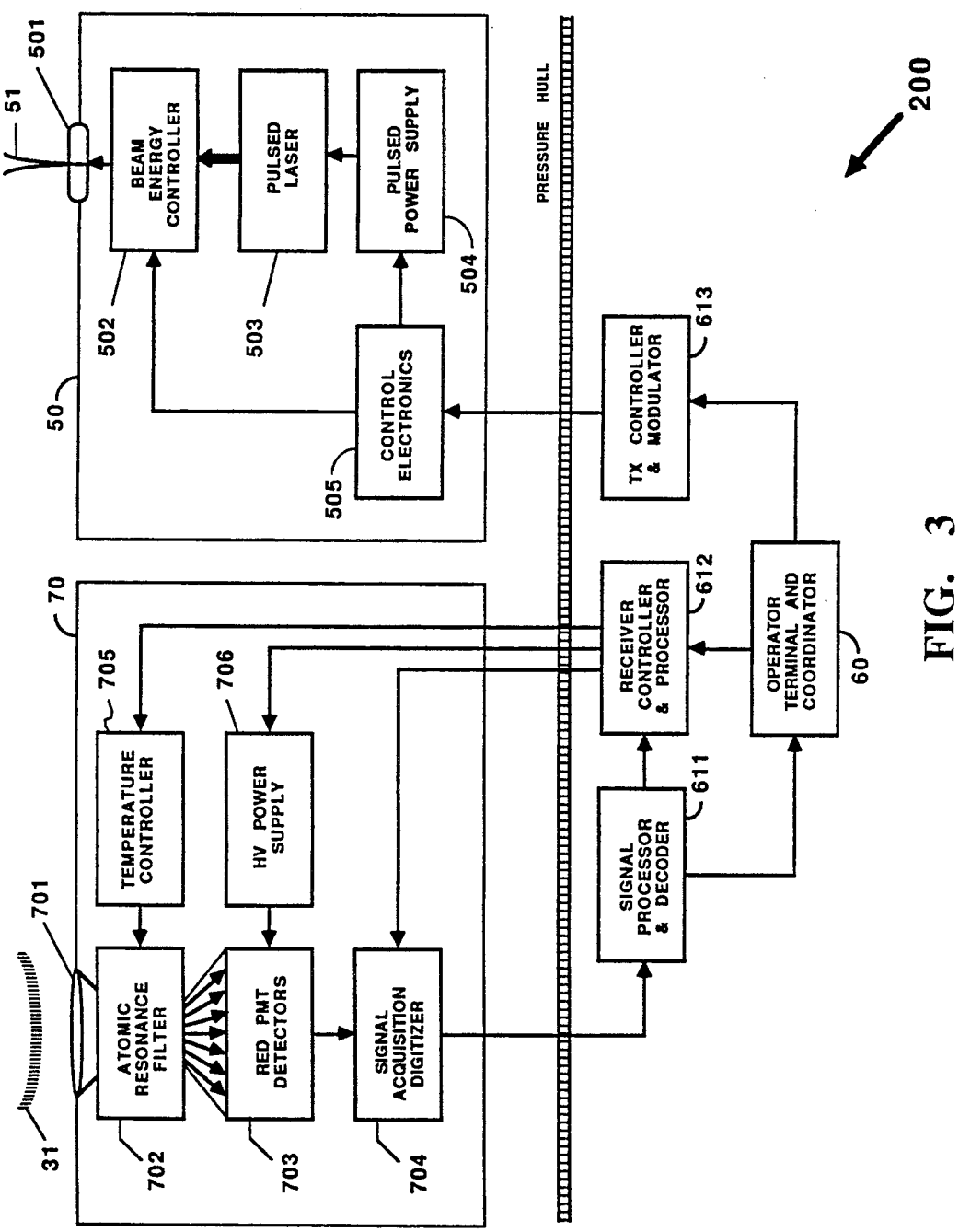
FIG. 3 is a block diagram of a submerged laser transceiver according to the present invention.

As depicted in FIG. 3, the submarine laser transmitter comprising functions 501–505 is disposed outside the pressure hull in its own high pressure vessel, again to save space in the submarine and eliminate the need for an optical port. This vessel mounts to the outside of the submarine's hull. The submarine may carry several such laser modules for redundancy and additional laser power.

Scanning and Field-of-View Optics

In this section we discuss operational details of the transmit and receive optics assemblies which control the pointing and scanning angle of the downlink beam, the beam divergence, the receiver pointing and scanning angle, and the receiver field of view. In the preferred embodiment, airborne transceiver 100 uses two scanners and two field-of-view (FOV) or divergence optics: one each for transmitter 30 and one each for receiver 40. To assure a consistency throughout this section the following receive terms are used as defined here. Field-of-view is the full angle of acceptance of the receiver (sometimes referred to by others as angle-of-regard). The field-of-view half-angle is half the full angle of acceptance of the receiver. The receive aperture is the entrance diameter of the receiver optics, i.e., the size of the receiver "opening." The pointing angle is the angle made by line-of-sight of the receiver aperture with respect to nadir. The scan angle or the scanning angle is the angular deviation of the pointing angle as it is swept back and forth across some area. The total view area or scanned area is the plane area covered as the receiver field of view is swept back and forth across the ocean or clouds. The instantaneous view area is the plane area of acceptance of the receiver at a particular field of view setting.

Figure 6:
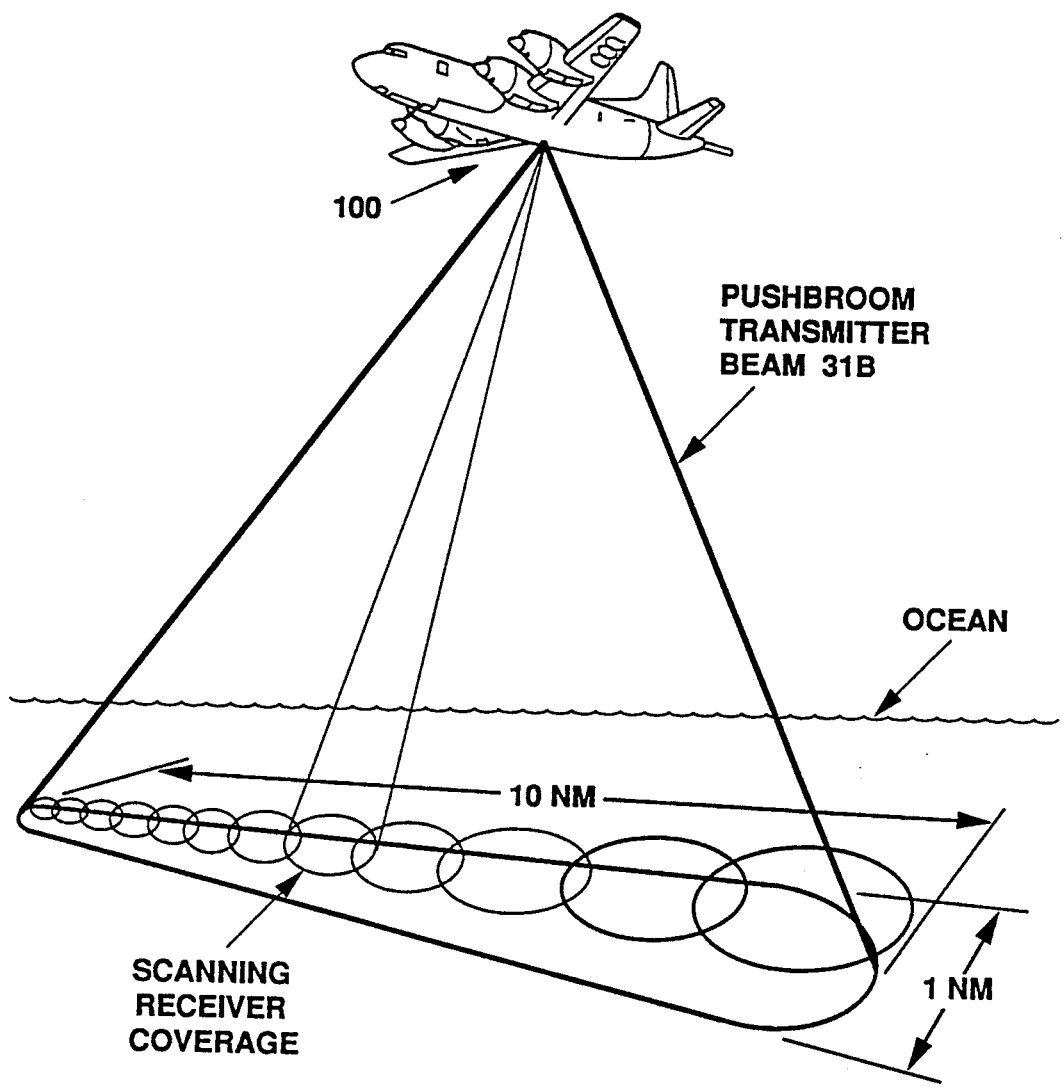
FIG. 6 is a pictorial diagram illustrating the airborne pushbroom transmitter scan and the receiver scanning used in accordance with the present invention.

Referring again to FIG. 2, in the acquisition mode when the airplane seeks to acquire the submarine's uplink beam, airborne transmitter 30 generates IFF pulses in the downlink beam in a predetermined beam scanning pattern designed to minimize the time to cover the search area. Various parameters including the beam scanning rate, the beam size and shape, and the airplane's motion are all monitored and coordinated by an operator at terminal 20 to ensure complete coverage of a predetermined search area. While airborne transmitter 30 scans, airborne receiver 40 similarly scans the ocean surface (as shown in FIG. 6) slightly behind the area described by the downlink beam looking for uplink pulses having the correct response sequence. The amount of spatial displacement behind the area described by the beam is based upon the speed of the plane, the predicted response time of the submarine transceiver 200 and weather conditions. When airborne receiver 40 senses the proper uplink pulses, receiver controller 410, in the preferred embodiment, issues a tracking mode command to the beam tracking controller 419 to lock onto the fixed spatial or terrestrial location from which the uplink pulses are emanating. This is usually a spot or area on the ocean surface, but it could also be an area on the top of low lying clouds (Receive controller 410 also sends a tracking mode command to the transmit controller 36, via operator terminal 20, to cause controllers 37 and 38 to lock the pointing angle of the beam central axis onto the same fixed location as the receive controller 419 for the two-way communicating mode.) The FOV controller 417 also varies the receiver's FOV optics 418 to maximize the optical S/N which maximizes the link connect time, i.e., the period during which the uplink and downlink beams convey message data.

Inasmuch as we have designed transmitter 30 to have variable beam control capabilities, it is a feature of this invention that two types of downlink transmitter beams are advantageously employed, each having certain advantages and disadvantages. The first beam type or scan is the "pushbroom" beam depicted in FIG. 6 as 31B. The pushbroom beam is spread out over the ocean surface creating an elongated oval-shaped illumination pattern. One advantage of the pushbroom beam is that the beam need not be laterally deflected from side-to-side relative to the direction of flight to cover the maximum effective area in which communication can be established. The motion of the airplane itself "sweeps" the beam illumination pattern across the surface of the water as the plane flies its predetermined course. The pushbroom beam has particular utility in the acquisition mode.

The second beam type or scan is referred to as the circular spot beam or simply the spot beam. As the name implies, the unmodified beam 31 creates a circularly-shaped illumination pattern or "spot" on the surface of the ocean. Like the pushbroom beam, the spot beam can be used during both the acquisition mode and the communication modes. In the acquisition mode the two-axis gimbal 35 laterally sweeps the spot beam back and forth to the direction of flight to cover basically the same area as the pushbroom. Two examples of the spot scan (used in the acquisition mode) are shown in FIG. 7 which depict the centerline 28a & b of the spot scan as viewed from a search plane. There are a large number of feasible search patterns (27a & b) that a search plane could employ to locate a friendly submerged vessel. Once the location of the submarine is determined, the search plane (not shown in FIG. 7) continues on its course while gimbal 35 fixes the downlink beam pointing angle on the terrestrial location directly above the submarine for continuous communication.

An advantage of the pushbroom scan 31B in FIG. 6 over the spot scan is that for a fixed number of IFF pulses, the pushbroom scan can cover a wider search area. However, since any practical system is power limited, the size of the beam illumination pattern also determines the underwater depth limit of communication. For greater depth penetration the spot scan is far superior to the pushbroom scan since its energy density is much greater. Alternatively the pushbroom beam offers greater security (LPI) since it is somewhat more difficult for an unwanted listener to sense the lower reflected pushbroom beam energy.

Referring again to FIG. 6, the pushbroom beam has an elongated elliptical shape with the narrow dimension along the direction of the aircraft's flight path. In clear weather the nominal divergence angle ranges for the beam sweep are ±60° transverse to the direction of flight, and ±15° along the direction of flight. In cloudy weather or at higher or lower altitudes, the transmit optics modify the beam size and shape to compensate for beam spreading in the clouds. Generally clouds of average density spread a laser beam by an amount approximately equal to the cloud thickness. Thus, beam divergence optics 34 narrow the downlink beam as viewed on the surface of the clouds to compensate for this spreading within the clouds. (For broken clouds a larger beam spot at the top of the clouds would be necessary.) Generally the transmitter optics 34 and 35 maintain a large oval illumination pattern on the ocean surface which is optimized for maximum area coverage consistent with reasonable depth penetration of the downlink beam 31. The beam steering controller 38 and the two-axis gimbal 35 also compensate for the airplane's flight dynamics and instantaneous deviations to insure that beam 31 illuminates a contiguous area on the ocean without gaps as the plane cruises. The programming of operator terminal 20 assists in setting the scanning pattern based upon numerous factors including weather conditions. Basically the width of the pushbroom (e.g., 10 nmi-nautical miles) times the velocity of the airplane, V, determines the rate at which the airplane can cover the submarine operating area. The length of the illuminated area, L, must be sufficiently large to allow for the pre-established minimum number of IFF acquisition and supervisory information pulses required to be transmitted. In the preferred embodiment this number is approximately 40.

The beam length relationship programmed into operator terminal 20 may be expressed as:

$$L = (V)(N/R) \qquad (1)$$

where:

$V$ = the velocity of the plane,
$N$ = the number of acquisition pulses, and
$R$ = the pulse repetition rate.

There are at least four different operational combinations for the two types of downlink beams:

|     | Acquisition Mode | Communication Mode |
| --- | --- | --- |
| (1) | pushbroom beam | pushbroom beam |
| (2) | pushbroom beam | spot beam |
| (3) | spot beam | pushbroom beam |
| (4) | spot beam | spot beam |

For most situations beam mode combinations 1 and 2 offer the greatest advantages, and are therefore the preferred operational modes. In both combinations, during the acquisition mode, the pushbroom beam is employed independently of the beam type used during the communication mode of operation. For the least probability of intercept by an adversary, the pushbroom beam is used in both modes of operation. Since, in the preferred embodiment of this invention, there is reserve power margin available in the downlink beam, assuming 1 joule/pulse, the S/N in the submarine is not degraded when the pushbroom beam is employed for both the acquisition and communication mode. However, for maximum S/N in the submarine, the airborne transmit optics should switch to the spot beam during the communication mode.

Figure 2:
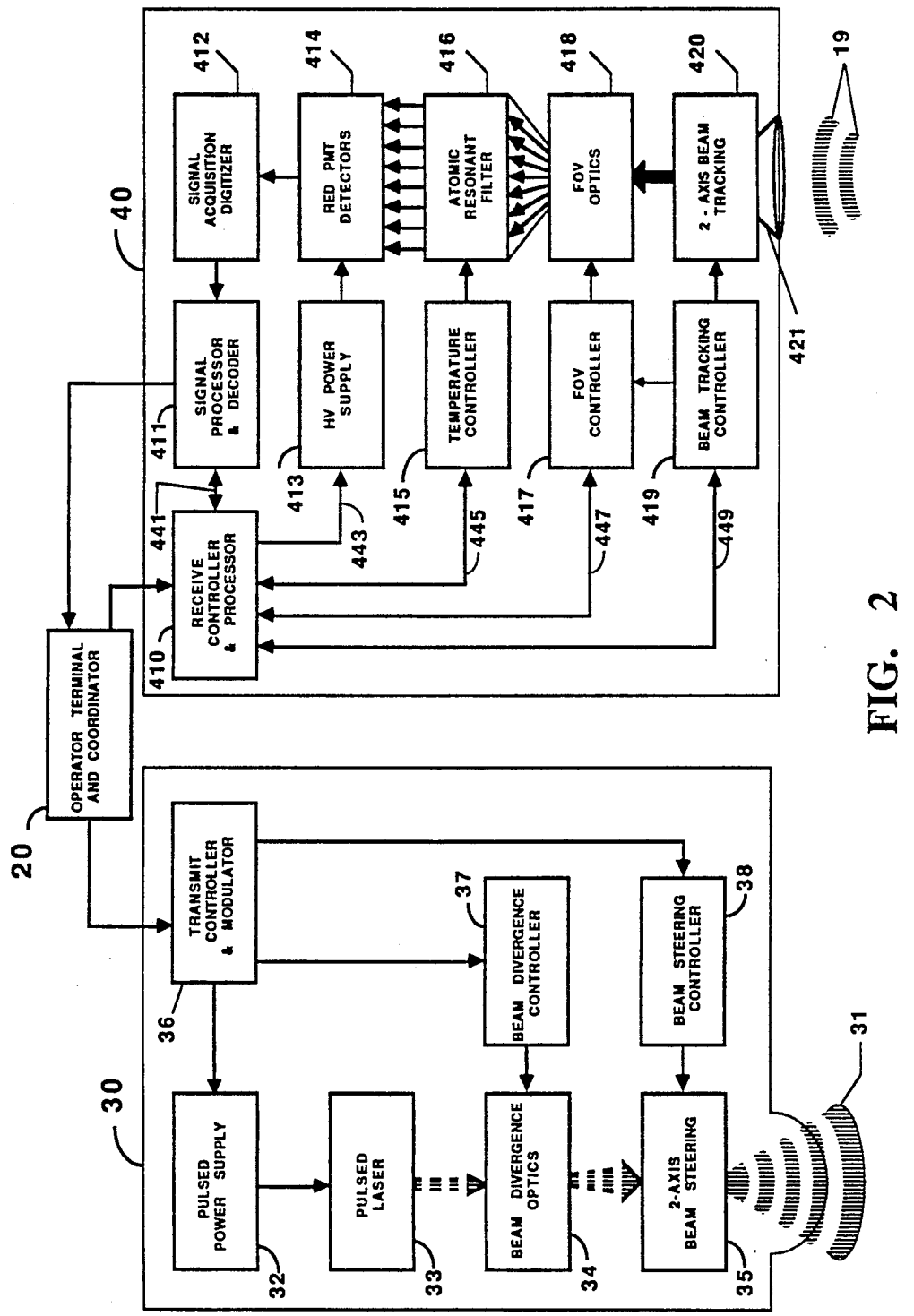
FIG. 2 is a detailed block diagram of an airborne laser transceiver according to the present invention.
Figure 8:
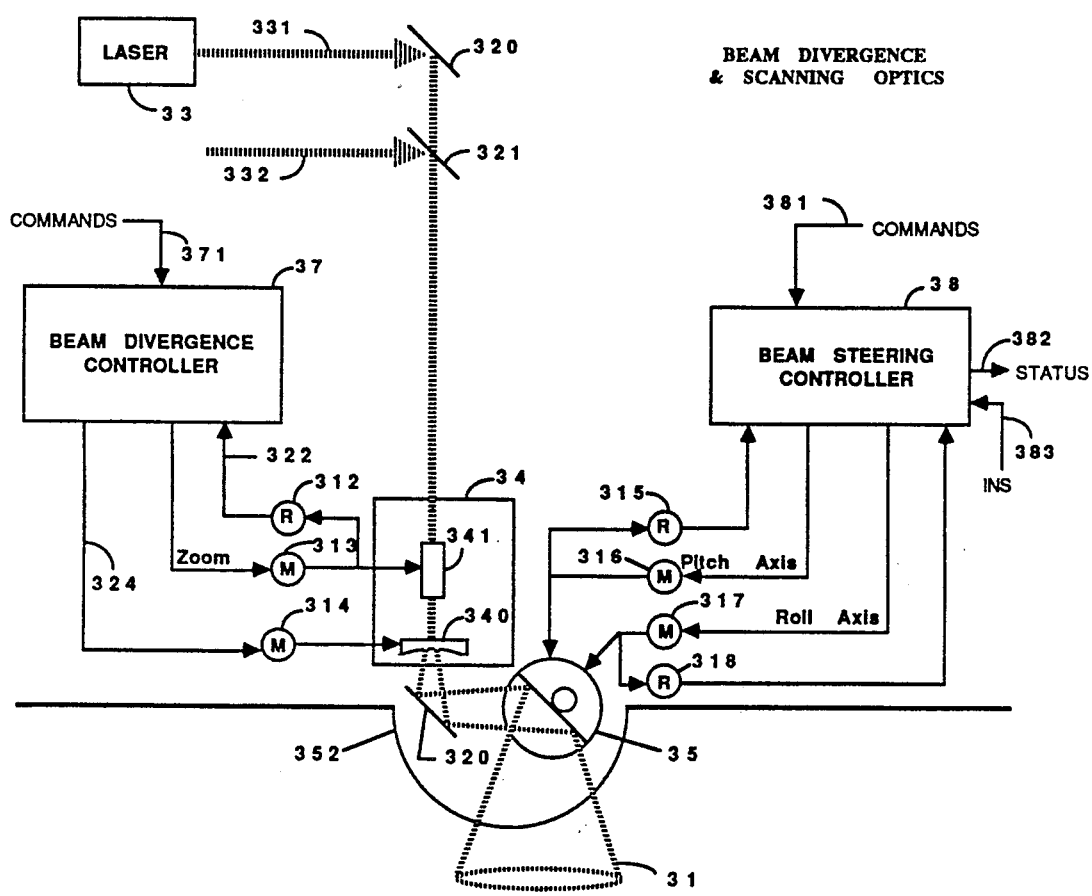
FIG. 8 is a detailed block diagram of the transmit optics portion of the airborne laser transceiver.

Referring to the apparatus shown in FIG. 2 and FIG. 8, both types of downlink beams are controlled by the beam divergence control and optics assembly 34 and 35. The laser beam on path 331 and any other additional beams on path 332 are directed via mirrors (or prisms) 320 and 321 to the divergence control optics 34 which comprises a set of adjustable zoom lens elements 341 and cylindrical lens element 340. The servo-controlled zoom lens 341 has a continuously variable control over the size of the illuminated spot on the ocean surface, or in combination with cylindrical lens 340, the size and aspect ratio of the pushbroom beam. The cylindrical lens element 340 has a focal length which varies with the orientation of the lens. Optic elements 341 and 340 change the angular size and shape of the beam in response to drive signals generated by divergence controller 37 in response to commands on path 371 from the transmit controller 36. The beam divergence commands from the transmitter controller 36 enter a servo amplifier in beam divergence controller 37, and are converted to control signals which drive the zoom drive motor 313. The servo-feedback loop is closed through the synchro-resolver 312 which sends zoom-angle position data on path 322 to the beam divergence controller 37. Those commands affecting the lateral spreading of the beam (on path 324) drive cylindrical lens motor 314 which removes or inserts lens 340 from the beam path for spot or pushbroom beams. The shaped beam at the output of lens 340 passes from the divergence optics 34 via mirror 320 to a single mirror or prism mounted on a servo-controlled two-axis gimbal 35. The two-axis gimbal 35 steers the beam out window 352 fore and aft along the aircraft course (pitch axis) and lateral to the course (roll axis) according to the command signals it receives from steering controller 38.

The command directives on path 381 are converted by a servo amplifier in beam steering controller 38 to appropriate drive signals to power servo motors 316 and 317 for pitch and roll movement of the gimbal.

Synchro-resolvers 315 and 318 connected to the beam steering gimbal 35 send scan angle data to the beam steering controller 38. Beam steering controller 38 then compares the current scan angles with those required. If a difference exists, the beam steering controller 38 generates position error signals which drives the two-axis gimbal 35 to null out the errors. Beam steering controller 38 compensates for aircraft altitude using the INS signals 383.

The commands from the operator terminal 20 through the transmit controller 36 direct the operation of the beam divergence controller 37 and steering controller 38 to provide the following:
(a) Circular spot beams of specified size;
(b) Pushbroom beam of specified size and aspect ratio;
(c) Circular spot beam swept from side-to-side;
(d) Pushbroom beam pointed at a fixed angle;
(e) Circular spot beam or pushbroom beam fixed on a specific location on the ocean surface, until the scanner reaches its angular range limit, i.e; a variable pointing angle; and,
(f) Variable beam divergence to compensate the beam spot size for the extreme slant of the pointing angle at wide scan angles.

These commands are given directly to beam divergence controller 37 via path 371 and beam steering controller 38 via path 381 which are programmed to generate the electrical signals that operate the optics 34 and beam steering gimbal 35. There are any number of ways the two-axis gimbal 35 could be implemented. Two manufacturers that produce commercial two-axis gimbals suitable for this application are Ball Aerospace, Inc; of Boulder, Colo. and Versatron Corp. of Healdsburg, Calif. Alternatively custom designed gimbals could be easily fabricated.

The firmware in the transmit controller 36, the beam steering controller 38 and the beam divergence controller 37 incorporates scan algorithms which process the operator's inputs, aircraft altitude, heading and speed to produce the scan and zoom commands (to the servo amplifiers) required for the selected scan. The beam steering controller 38 receives aircraft pitch, roll and drift angle (yaw) data in synchro format from the aircraft's inertial navigation system (INS), and modifies scanner servo commands to compensate for aircraft motion. The scanner status data is fed back via path 382 to the transmit controller 36.

The operator interfaces with the transmit and receive controllers 36 and 410, respectively, via operator terminal 20 which in the preferred embodiment is a ruggedized desk top type computer. The operator terminal 20 communicates with the aircraft's electronics via a HPIB or Serial Line Data Bus, neither of which is shown in the drawings.

Referring again to FIG. 2, the operator at terminal 20 sets the divergence angle (DIV∡) of the downlink beam 31 to project the desired spot size when the beam points at nadir. The operator can determine from the altimeter in the plane its altitude (A) and, through visual or other more precise electronic techniques (such as time-of-flight and other characteristics of the backscattered downlink beam), the height and thickness of the clouds if any. The operator enters the spot size, altitude and cloud data at terminal 20, and the processor in operator terminal 20 uses these inputs to compute the beam divergence angle. For a circular spot the relationship used to compute the beam divergence in one embodiment would be:

$$(DIV) = Tan^{-1}\left[\frac{\text{spot diameter} - \text{cloud thickness}}{2(\text{altitude} - \text{cloud height})}\right] \quad (2)$$

where, "cloud height" is the altitude of the bottom of the cloud and spot diameter is > cloud thickness.

The system processor in terminal 20 imposes constraints on this computation so that the DIV angle does not exceed the physical limits of the equipment.

The operator terminal 20 also controls the insertion of the cylindrical lens 340 to form the pushbroom beam. If the beam is circular and scanned laterally the beam divergence DIV is adjusted for the scan angle which maintains a constant width on the surface. The processor in terminal 20 uses the following relationship to effect this adjustment through troller 36 in one embodiment:

$$DIV\text{∡} = Tan^{-1}\{[Cos(Scan\ \text{∡})] \times [Tan\ (DIV\text{∡}\ \text{at nadir})]\}. \quad (3)$$

Figure 9:
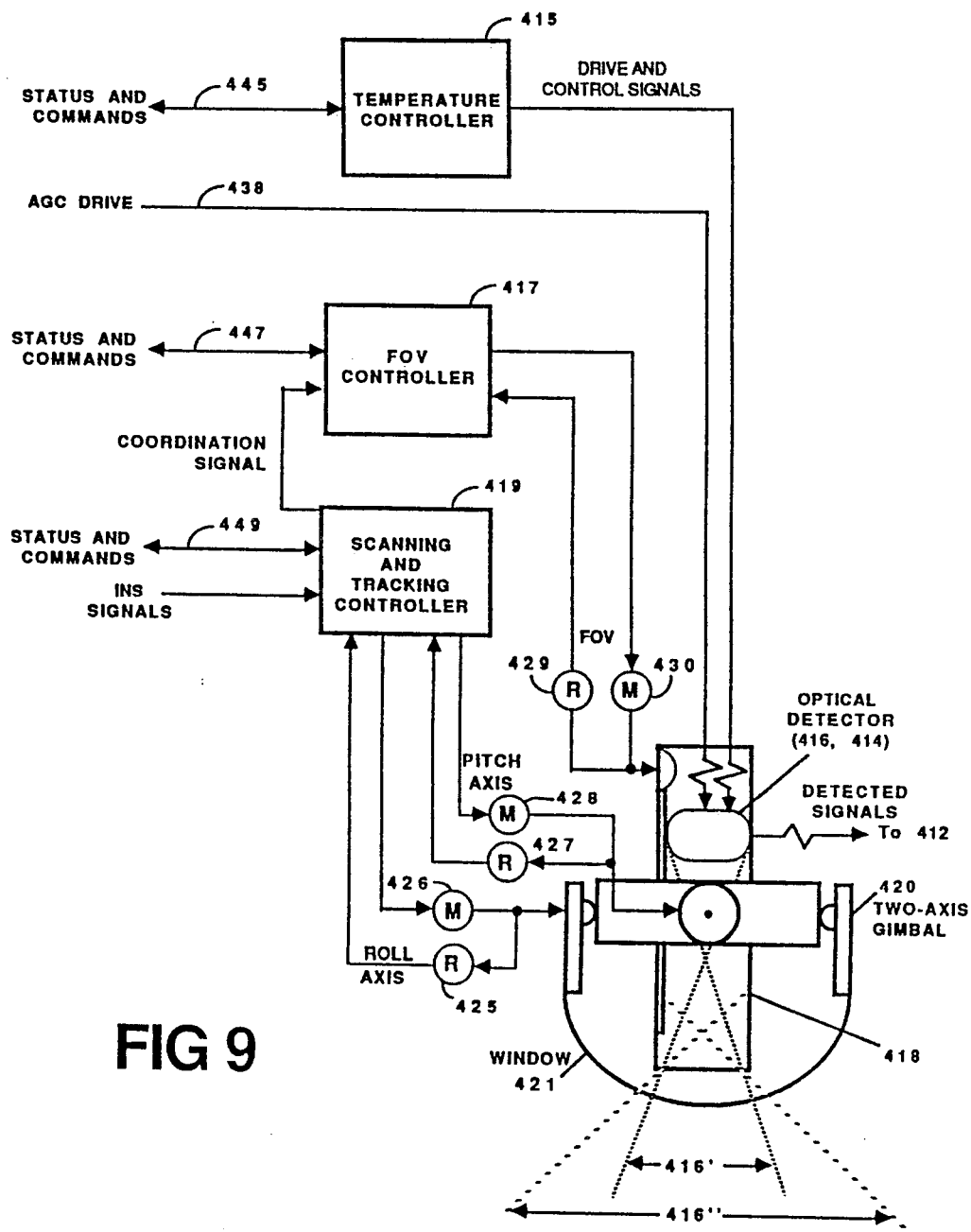
FIG. 9 is a detailed block diagram of the receive optics portion of the airborne laser transceiver.

Moving now to a functional discussion of the scanning portion of the receiver 40, which is functionally illustrated in FIG. 9, it provides three system functions: (1) it scans the receiver field of view across the surface of the ocean or clouds so as to continuously search for an uplink beam over a large area; (2) it adjusts the pointing angles to compensate for instantaneous course deviations of the aircraft; and (3) it tracks the motions of the aircraft during the message portion of the link in order to maintain the receiver's pointing angle at a relatively fixed terrestrial location for receiving uplink signals. (An appreciation of the difficulty of designing an optical receiver, as just described, comes when considers the systems aspects of what the receiver must accomplish under all environmental conditions. Basically it must recover a low power laser beam from a submerged submarine travelling beneath hundreds of feet of ocean water, and through thousands of feet of atmosphere and clouds using a small aperture mounted on an aircraft travelling at a forward velocity in the range of 200 to 400 miles/hour.)

In a second embodiment one could employ an actively tracking receiver, once the uplink beam has been located, to maintain optimum S/N during the communicating mode. One such receiver would employ a quadrant array of ARF cells and photo-detectors at or near the focal plane to provide tracking error signals, and to drive the receiver field-of-view to of maximum received energy.

In general the instantaneous viewing area of the receiver, i.e., the field of view, is determined by the field-of-view half angle ($\alpha$) of the receiver. The view diameter (D) of the total viewing area for the receiver may be determined from:

$$D = \frac{(2A)Tan\alpha}{Cos\theta} ; \quad (4)$$

where,
$\Theta$ = the scan angle, and
A = the altitude of the aircraft.

As the altitude of the aircraft changes and the scan angle of the receiver changes, the receive field-of-view should be varied to maintain a constant viewing area on the ocean surface. This is desirable since the receiver obtains its optimum S/N when the viewing area on the surface matches the illumination pattern (spot size) of the uplink beam 52 (see FIG. 1). The size of uplink spot 52 can vary from a few hundred feet on the ocean surface to more than 10,000 feet at the top of a cloud, so in theory the range of the field-of-view angle spans a few degrees to as much as 160°. The size of the viewing area in relation to the speed of the aircraft during the acquisition mode also governs the field-of-view angle. In general, the field-of-view angle must be sufficiently large so that the receiver can sense 40 or 50 IFF/acquisition pulses before the view area moves off of the uplink spot 52. The same relation as that of the transmitter applies to the receiver (equation 1 above). Then during the message portion of the communication link, the receiver must switch to a tracking mode to lock the receiver pointing angle onto the fixed spatial or terrestrial location from which the uplink pulses emanate and to automatically adjust the field of view and pointing angle to maximize the S/N.

Referring to FIG. 9, depicted therein partially in block diagram form is the optics portion of receiver 40 which consists of the receive scanning and field-of-view control apparatus. Light enters the receiver through window 421. That portion which falls within the field-of-view of telescopic barrel 418 enters the movable optical detector 416 and 414.

The optical detector collects the signal light, filters out the background light and sends the detected electrical signal to pulse amplifier/prefilter 412 and signal processor 411 (shown in FIG. 2) both of which are described previously. The viewing area is controlled from the FOV controller 417 in response to command directives on path 447 from the receive controller 410. FOV controller 417 uses a servo amplifier (not shown) to convert these command directives to drive servo motor 430 which moves the optical detector (416 & 414) along the longitudinal axis of barrel 418. The servo-feedback loop is closed through the synchro-resolver 429 which sends FOV-angle data to FOV controller 417. When optical detector (416 & 414) is farthest from the window 421, as shown in FIG. 9, the FOV angle 416′ is narrow, and when it is closest to the window 421, the FOV angle 416″ is at its widest. The inner surface of telescopic barrel 418 has a non-reflective coating to only allow direct light from the opening next to window 421 to reach the detector which is movably mounted within the barrel. The dimensions of the barrel 418 are controlled by the aperture size and the field of view desired. Although system considerations would otherwise dictate a larger aperture size, in practice the aperture is limited by the size of the ARF 416. The range of field-of-view angles desired sets the length of the barrel 418. Certainly there are other methods by which the field-of-view might be varied, e.g. a series of baffles placed in front of the ARF opening could channel the incoming light through holes aligned from one baffle to another.

Referring again to FIG. 9, the scanning and tracking of receiver 40 are controlled by the scanning and tracking controller 419 in combination with the receiver controller and processor 410 (shown in FIG. 2). Optical detector (416 & 414) and barrel 418 are mounted on a two-axis gimbal 420. The scanning and tracking controller 419 controls the motion of the two-axis gimbal with its drive and control signals. The two-axis gimbal 420 steers the receive field of view out window 421 fore and aft along the aircraft course (pitch axis) and lateral to the course (roll axis) according to the command signals it receives from steering and tracking controller 419. The command directives on path 449 are converted by a servo amp in tracking controller 419 to appropriate drive signals to power servo motors 428 and 426 for pitch and roll movement, respectively, of gimbal 420. Synchro-resolvers 427 and 425 connected to the steering gimbal 420 send tracking angle data back on path 449 to the receiver controller 410 via tracking controller 419. The tracking controller 419 then compares the current scan angles with those required. If a difference exists, the tracking controller 419 generates position error signals which drive the two-axis gimbal 420 to null out the errors. An operator at terminal 20 can cause the receiver 40 to point at any location desired.

The status and command signals from the receive processor 410 direct the operation of the two-axis gimbal 420 and the FOV control 418 to provide one of the following functions, some of which may be provided at the same times:

1. Set field-of-view angle at NADIR
2. Adjust field of view for scan angle or keep it constant
3. Raster scan mode
4. Track and stare mode.

The scanning and tracking controller 419 also uses the INS signals from the aircraft's guidance system to compensate for aircraft motion. The AGC signals on path 438 from receive controller 410 adjust the gain of the receiver detector according to the background levels seen in the optical detector 416/414.

To keep the communication exchange as short as possible, airborne receiver 40 must coordinate its scan with that of transmitter 30. How the receiver scan coordinates with the transmitter scan depends upon the transmitter's scanning mode. During the pushbroom scan, receiver 40 matches its field of view to be somewhat larger than the length of the pushbroom area and scans somewhat behind and along the width of the downlink beam, essentially scanning side-to-side as the airplane cruises. This is depicted in FIG. 6. During a spot scan of the downlink, receiver 40 has a field of view somewhat larger than that of the downlink beam and its scanning lags behind that of the transmit beam to allow for the delay in the response of the submarine. Once the communication link is established, both scanners cease scanning and receiver 40 tracks the uplink beam and the downlink beam points to the same location as the receiver.

During the acquisition mode, the uplink airborne receiver 40 sets its field of view to be generally larger than the expected uplink beam spot at the viewing surface (either clouds or water). This allows the airborne receiver 40 to encompass the entire uplink beam spot while scanning in the acquisition mode. Thus, the uplink beam spot will remain within the field of view for sufficient time to be recognized while receiver 40 scans the ocean or cloud surface. When the receiver identifies an uplink signal, for example, with two to four pulses, the airborne receiver can reduce the background noise and improve the S/N by narrowing its field of view to the point where it matches the uplink beam spot size, while pointing directly at the spot.

In all three modes, during clear weather the uplink beam spot is quite small, and airborne receiver 40 employs a relatively small field of view to reduce the background against a small beam spot. However, in cloudy weather the uplink beam may grow to considerable size, and the airplane may be quite close in altitude to the beam spot at the top of the cloud layer. In this case the airborne receiver has a large field of view so that it can take in as much of the uplink light as possible.

Tracking, scanning and field of view considerations in transceiver 200 are quite simple given the local environment of the submarine transceiver and the very moderate mobility (during an engagement time) of the submarine. Transceiver 200 always stares straight up and has no need for limiting the field of view or aperture size. This is because in both types of downlink scans, when beam 31 enters the water at an angle, it retains its directionality for only about the first 30 meters below the surface. Thereafter the beam descends in the water and spreads as generally shown in FIG. 1. Therefore, any scanning or field of view capability in receiver 70 would be of little value.

Atomic Resonance Filter Assembly

Figure 4:
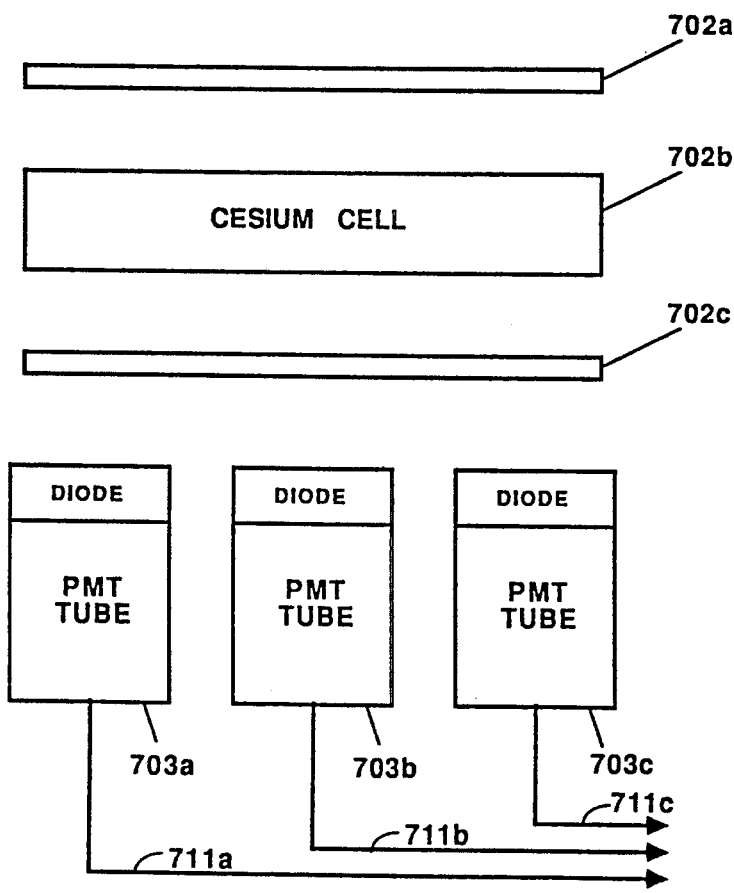
FIG. 4 is a structural block diagram illustrating a portion of a very narrow-band atomic resonance filter (ARF) employed in transceivers 100 and 200 shown in FIG. 1.

Referring to the block diagram shown in FIG. 4, greater functional detail of preferred atomic resonance filter assembly (702 and 703 in FIG. 3) will now be described. Most of the following description is also applicable to ARF 416 and PMT detectors 414 in FIG. 2. In this embodiment, the principal components of the ARF assembly are optical filters 702a & c, a cesium cell assembly 702b, and three hybrid photomultiplier tubes (PMT) 703a, b, & c. Basically the filter assembly functions as a very narrow-band isotropic atomic resonance optical filter having a signal bandwidth <0.0025 nm. The filter is fixed (using a cesium cell in the preferred embodiment) at the transmitter wavelengths ($\lambda$) of either 455 nm or 459 nm and efficiently converts the received laser pulses into electrical pulses while profoundly attenuating any solar background radiation due to its narrow bandwidth. The ARF does this by converting incoming blue (455 nm and 459 nm) photons to near-infrared (NIR) photons which are passed on to three PMT's 703. However, that portion of solar radiation within the cesium cell absorption bands (blue) cannot be blocked, and becomes the dominant source of noise for the system.

More specifically, the first optical filter, 702a, is an absorptive type of optical broadband short-pass filter that allows photons in the cesium absorption profile of 459 and 455 nanometers (blue) to pass through the glass filter to be absorbed within the cesium cell 702b. The cesium cell 702b converts (fluoresces) incoming blue (455 and 459 nm) photons to NIR photons (852 and 894 nm). The red shift in the cesium cell separates most of the solar background from the desired signal photons. To optimize the photo conversion, the upper surfaces and sides of cell 702b are shaped and coated to contain the NIR light within the cell, thereby forming an optical integrating sphere for these specific photons. The second optical filter, 702c, is a combination of long-pass filters to pass the infrared photons from cell 702b through to the PMT detectors 703a-c while blocking ambient light outside the IR passband. The combination of optical filters and cesium cell 702b provides at least 60 dB of solar background attenuation. The red photons pass out through the bottom of cesium cell 702b and filter 702c and enter an array of three red light (852 & 892 nm) PMT detectors 703. The output signals on paths 711a-c from the red detectors are amplified, filtered, combined and passed on to the signal processor 611 shown in FIG. 3.

Figure 5:
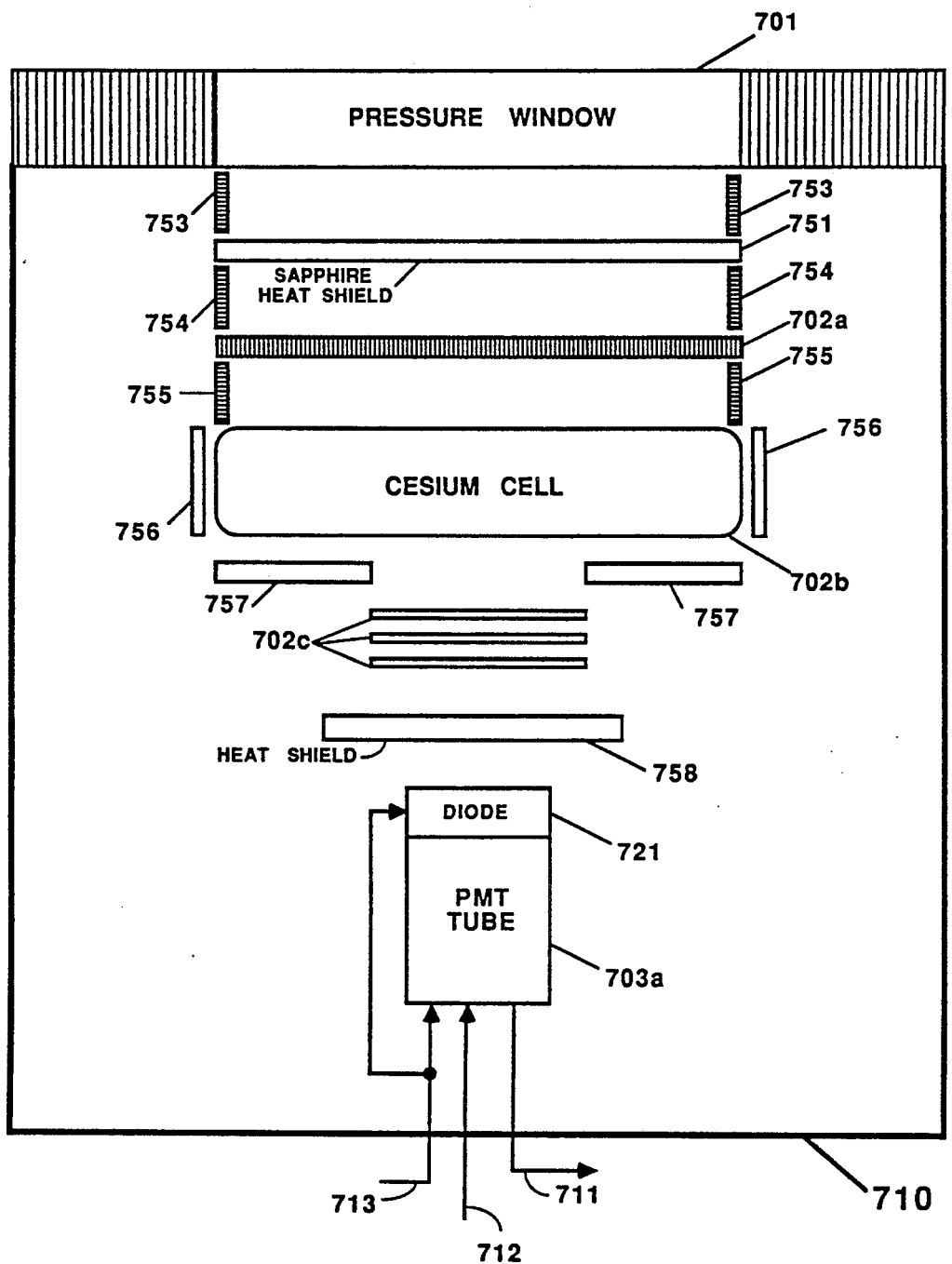
FIG. 5 is a structural block diagram illustrating greater detail of the atomic resonance filter employed in accordance with the present invention.

Referring to the block diagram shown in FIG. 5, greater detail of the atomic resonance filter assembly shown in FIG. 4 will now be described. In the submarine receiver, the atomic resonance filter assembly is contained within a heavy cylindrical steel pressure vessel 710 sufficient to withstand the operating environment outside the hull of a submarine. The optical receiving window 701 is an integral part of pressure vessel 710. In one embodiment the pressure window 701 is made of 4 inch thick Plexiglass ® plastic to withstand the high pressures. The inside surface of the window is anti-reflection (AR) coated for either 455 nm or 459 nm (quarter-wave magnesium fluoride) to optimize the transmission of the desired signal photons. The window needs to be maintained at temperatures below 100° F.

A sapphire heat shield 753 (0.25 in thick) reduces heat flow from the hot cesium cell 702b to the pressure window 701 and is AR coated on both sides for either 455 nm or 459 nm. (A coating of magnesium fluoride may be used here.) Blue reflectors 753, 754, and 755 are placed around the circumference and above cesium cell 702b to redirect high-angle incoming blue-signal photons downward toward cesium cell 702b. An enhanced aluminum reflective coating deposited on 5-mil thick kapton film is an effective relector, since it is flexible enough to cover the interior chamber of the container 710.

The first color (BG-39) filter 702a absorbs photons in the NIR region and passes signal photons at either 455 nm or 459 nm to cesium cell 702b. The thickness of the first filter 702a is chosen to optimize transmission at either 455 nm or 459 nm while providing 60 dB attenuation at wavelengths of 700 nm to beyond 1000 nm. The top side of the glass 702a (as shown in FIG. 5) is AR coated and the bottom is also coated to reflect 852 and 894 nm light. This is to reflect any NIR photons emerging from the cesium cell 702b back down into the cell. This provides the top of the integrating sphere for NIR photons.

In the preferred embodiment, the cesium cell 702b uses a pyrex-type glass cylinder containing gaseous cesium at a low pressure of approximately 4 Torr and gaseous neon (a buffer gas) at a pressure of approximately 15 Torr. The cesium sublimes to the gaseous state when heated above approximately 30° Celsius. The cesium condenses at those points within the cell which are below 30° C. The vacuum fill point for the cell is designated as the "cold spot" of the cell. It functions as a cesium reservoir by maintaining its temperature at least 20° cooler than the rest of the cell. The temperature of the cold spot is controlled by the electronics assembly to maintain a specific gaseous cesium density inside the cell. Since the cesium density affects the optical bandwidth of the ARF, the bandwidth may be narrowed (but maintained wider than the signal line) at shallow submarine depths for greater attenuation of ambient light, and widened at greater depths for increased sensitivity.

The cesium cell housing (not shown in FIG. 5) contains two heaters, one for the cell side (edge) and the other for the cold spot. The heaters are controlled by closed-loop servo circuitry (also not shown). Thermal sensors at the cell edge, cold spot, and center provide analogs of these temperatures to the temperature control circuitry 705 in FIG. 3. The cesium cell cold spot and center temperatures can be monitored and set at the receive controller and processor 612. The cell edge heater temperature can be monitored at Operator Terminal 60, but not set. The cesium cell 702b is heated to approximately 100° C. and the vapor pressure is accurately controlled to optimize the cell performance. For safety reasons the heaters are shut off automatically if he cell temperature exceeds 250° C. The space between the outer side wall of the cesium cell and the cell heaters (not shown) is tightly packed with barium sulfate powder 756. This powder is a highly diffuse reflector to NIR and comprises the side wall of the integrating sphere around the cesium cell 702b. Reflector 757 comprises the bottom of the integrating sphere. This assembly reflects both the near IR and signal blue light back into the cesium cell, while thermally isolating the cesium cell assembly from the PMT assembly.

There are three post-cell filters 703c designed generally to attenuate ambient sunlight while allowing the NIR signal photons to pass through to PMT detectors 703. Three separate Optical filters are used to obtain 60 dB of attenuation of incoming solar radiation from 200 nm to 1000 nm in conjunction with the first color filter 702a. The top filter has a coating next to cell 702b to reflect unabsorbed blue signal photons back to the cesium cell for absorption while allowing the NIR photons to pass through. All three filters also act as radiative heat shield to attenuate thermal radiation from cell 702b to the PMT 703. Both sides of the bottom filter 702c and the top of heat shield 758 are AR coated with magnesium fluoride at 852/894 nm. The primary purpose of heat shield 758 is to absorb the thermal radiation from the cesium cell which remains after passing through the filter stack 703c. Shield 758 also advantageously provides additional rejection of the 200 nm to 700 nm solar spectrum.

Before the ARF housing 710 can be operated all water vapor must be removed. This is done by purging the entire chamber with dry nitrogen. For additional details on ARF's refer to *MILCOM 87 Proceedings*, "Atomic Resonance Filter Optical Receiver (AR-FORM) Module," by Paul Titterton and James F. Shaw, No. 25.1, Oct. 21, 1987 or to *IEEE Journal of Quantum Electronics*, "Atomic Resonance Filters," by J. A. Gelbwachs, Vol 24, No. 7, July 1988, pages 1266–1277, and the references cited therein on pages 1276–1277.

Each of the three-PMT assemblies 703a–c are two-stage devices. The first stage is a diode assembly 721 which converts the NIR output of cesium cell 702b to blue light for increased PMT conversion efficiency. The diode assembly 721 comprises a diode photocathode spaced apart from an aluminized phosphor screen (with a voltage drop of nominally +5500V). The photocathode responds to the NIR photons by emitting electrons which are immediately accelerated onto the phosphor screen. The phosphor screen emits a broad spectrum of photons peaked in the blue region which may be detected by a conventional PMT (703). Diode assembly 721 is enclosed in a ceramic envelope and separated by an isolation plate from a conventional PMT unit 703. Diode assembly 721 has a finite lifetime which can be measured in hundreds of millicoulombs of emitted charge. In order to prevent diode 721 from inadvertently being left on in full sunlight the power to the diode is turned off automatically if its current exceeds a specified maximum. Power to the diode and the PMT assembly 703a is supplied via path 713.

The second stage of PMT assembly 703 is a conventional photomultiplier tube (sensitive in the blue region) with a nominal 10-dynode multiplier section. The operator at terminal 60 can select a fixed gain for the PMT or elect to activate an automatic gain control (AGC) option via control lead 712. The AGC circuit (not shown in FIG. 5) makes the PMT gain inversely proportional to the ambient light level. The AGC circuit operates by measuring the rms value of the PMT noise output to drive a servo loop which controls the voltage supplied to the dynode chain. Further details of the PMT AGC may be found in U.S. Pat. No. 4,804,891 which is hereby incorporated by reference.

SIGNAL PROCESSING

Figure 10:
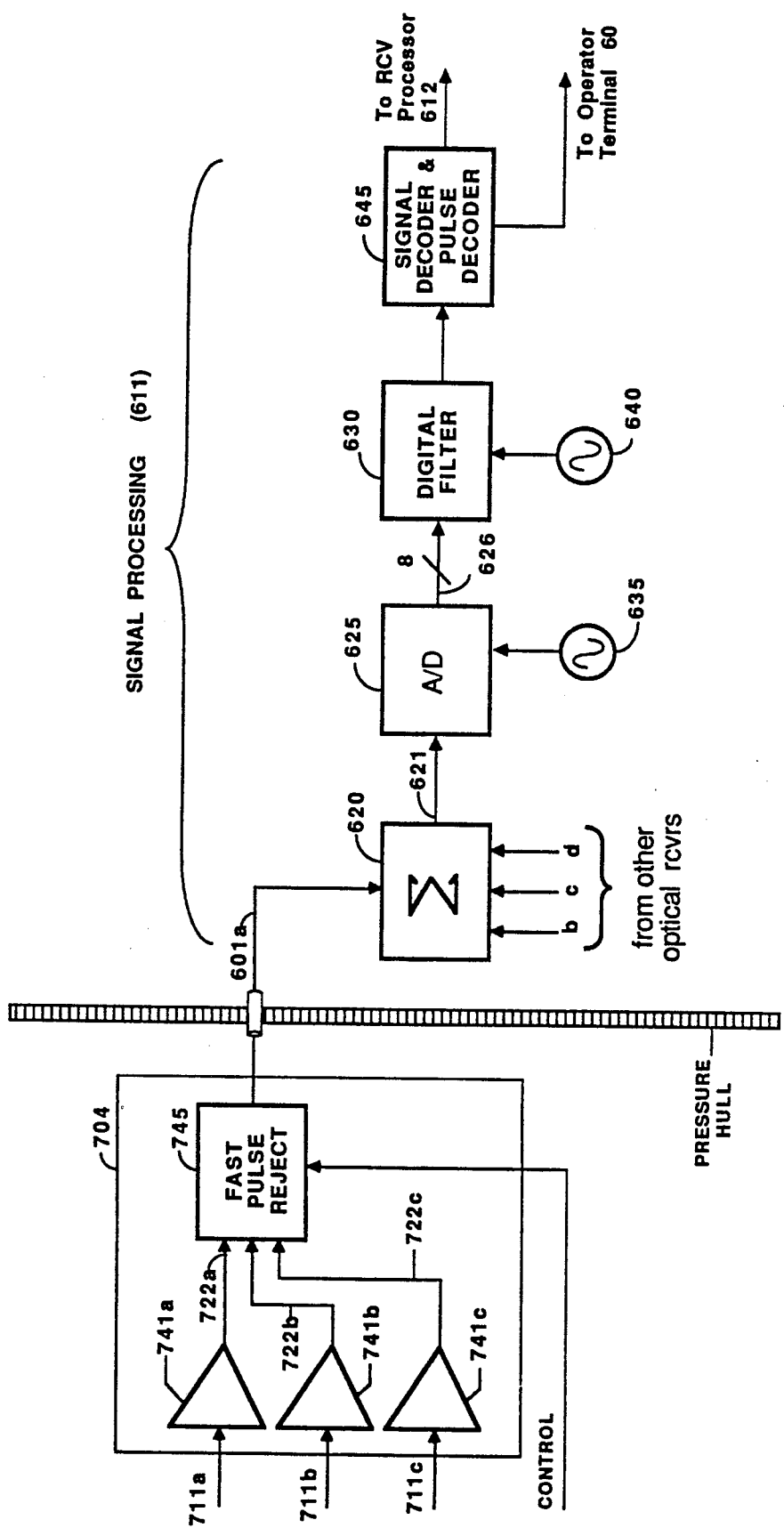
FIG. 10 is a structural block diagram illustrating greater detail of signal processing apparatus employed in both transceivers in accordance with the present invention.

As shown in FIG. 3 and in FIG. 10, each of the PMT outputs connect to the pulse amplifier/pre-filter 704. Referring to FIG. 10, the pulse amplifier/prefilter 704 comprises preamplifiers 741a, b and c and a multifunction circuit labelled fast-pulse rejection circuit 745. The three PMT signal outputs on paths 711a, b, and c are amplified by preamps 741a, b, and c, respectively. The buffered output signals from each preamp are amplified a second time and then combined in 745. The remaining portion of the 745 circuit includes a fast-pulse rejection feature for improved rejection. Since the desired signal pulses have a pre-established minimum width, the fast-pulse rejection circuit 745 treats pulses shorter than this minimum width (nominally 300 ns) as noise, and thus removes such bursts from the message video output. (In the preferred embodiment of the receiver, a leading edge detector and a trailing edge detector measure the pulse width of each incoming pulse. If the width of a pulse exceeds the preset period, a shunt switch at the output of the comparator is inhibited allowing the signal pulse to pass through the circuit for further processing.) This option is operator selected via the receive controller and processor 612.

The pulsed output signal on path 601a passes out of the pressure container and into the signal processor portion of the receiver 611. Signal processing is performed in a similar fashion in both airborne and submerged transceivers to recover the encoded digital signals from the pulse-position modulated signals at the output of pulse amplifier/pre-filter 704 and 412. To avoid redundant description only the submerged transceiver 200 will be discussed.

Functionally, the signal processor depicted in FIG. 10 accepts the unfiltered pulse signals from the pulse amplifier/pre-filter 704, combines these pulses with other signal pulses for improved S/N, converts the combined signal to an 8-bit digital format, and digitally filters and decodes the result. More specifically, a combiner circuit 620 adds the signal pulses on path 601a with other signal pulses from other optical receivers if present. In the preferred embodiment of this invention four separate optical receivers 70 collect the signal light to increase the effective aperture size of the receiver. Since each signal on path 601 should represent substantially the same received signal, combiner 620 performs a simple voltage addition using a video buffer amplifier to isolate the input paths. A high-speed A/D converter 625 accepts the combined output on path 621 and produces an 8-bit digital representation of the signal amplitude in 2's complement format. The 6 MHz clock oscillator 635 sets the A/D conversion rate and provides a sampling interval of 167 nanoseconds. The 8-bit parallel digital output on path 626 is in 2's complement form and represents the amplitude of an incoming pulse signal. It is routed to digital filter 630.

Filtering of the digital PMT output is constrained by the fact that clouds stretch the duration of a laser pulse by as much as 30 μs. Therefore, in the preferred embodiment, the active bandpass filters employed cover a pulse-width range of from 1.6 μs to greater than 30 μs pulses. The 1.6 μs lower limit matches the 2 μs fluorescent decay time of the ARF filter and the 30 μs upper limit filter covers pulses stretched by the worst case clouds.

Figure 11:
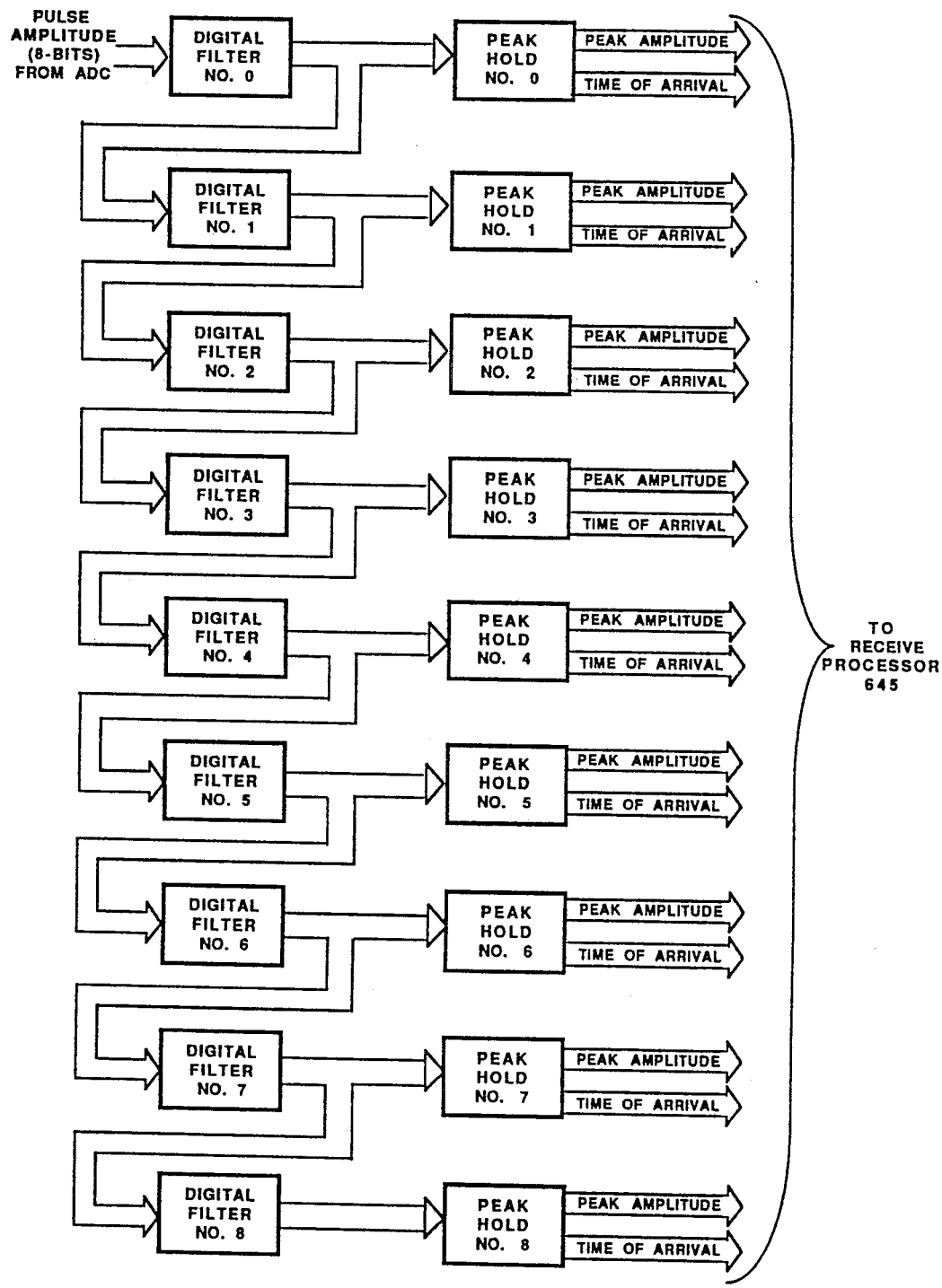
FIG. 11 is a block diagram of a digital filter employed in both transceivers in accordance with the present invention.

Referring to FIG. 11, digital filter 630 functionally comprises a bank of eight serially-connected digital filters implemented as sliding window integrators having integration intervals ranging from 2 to 256 samples. The filter processes the parallel input data on path 626 at a (4.915 MHz) rate set by clock oscillator 640 (9.83 MHz). The search interval of 2.5 ms is the same for all filters. The output of each individual filter element feeds a peak detector which captures the maximum integrator output and its time of arrival (TOA) over a 2.5 ms search interval. Since the pulse widths latched into the filter range from 1.6 to 30 ρs, only the output of five filters is required. Each filter 3 through 7 generates pulse amplitude data and TOA in parallel digital format for processing by signal decoder and signal and pulse decoder 645. Decoder 645 initially uses the peak amplitude data to determine which filter or group of filters to use for each processed pulse. It compares the peak amplitude output of each filter and then uses the filter data with the highest amplitude. It then refines the pulse data and decodes the PPM. The pulse information is passed to the receiver controller and processor 612 so that it can adjust the operating parameters of the optical receivers 70 for optimum performance and to control the response of the uplink communication which includes uplink power level, IFF codes and message.

The preferred embodiment for decoder 645 is a TMS 320 based digital signal processing microcomputer. A "Challenger" made by Sky Corporation could be used to perform such processing functions, including: discrete Fourier transforms, digital filtering, error correction coding, etc. as well as communications source coding functions. These functions require many real-time repetitive operations (such as multiplication and addition) on sampled data arrays.

Figure 12:
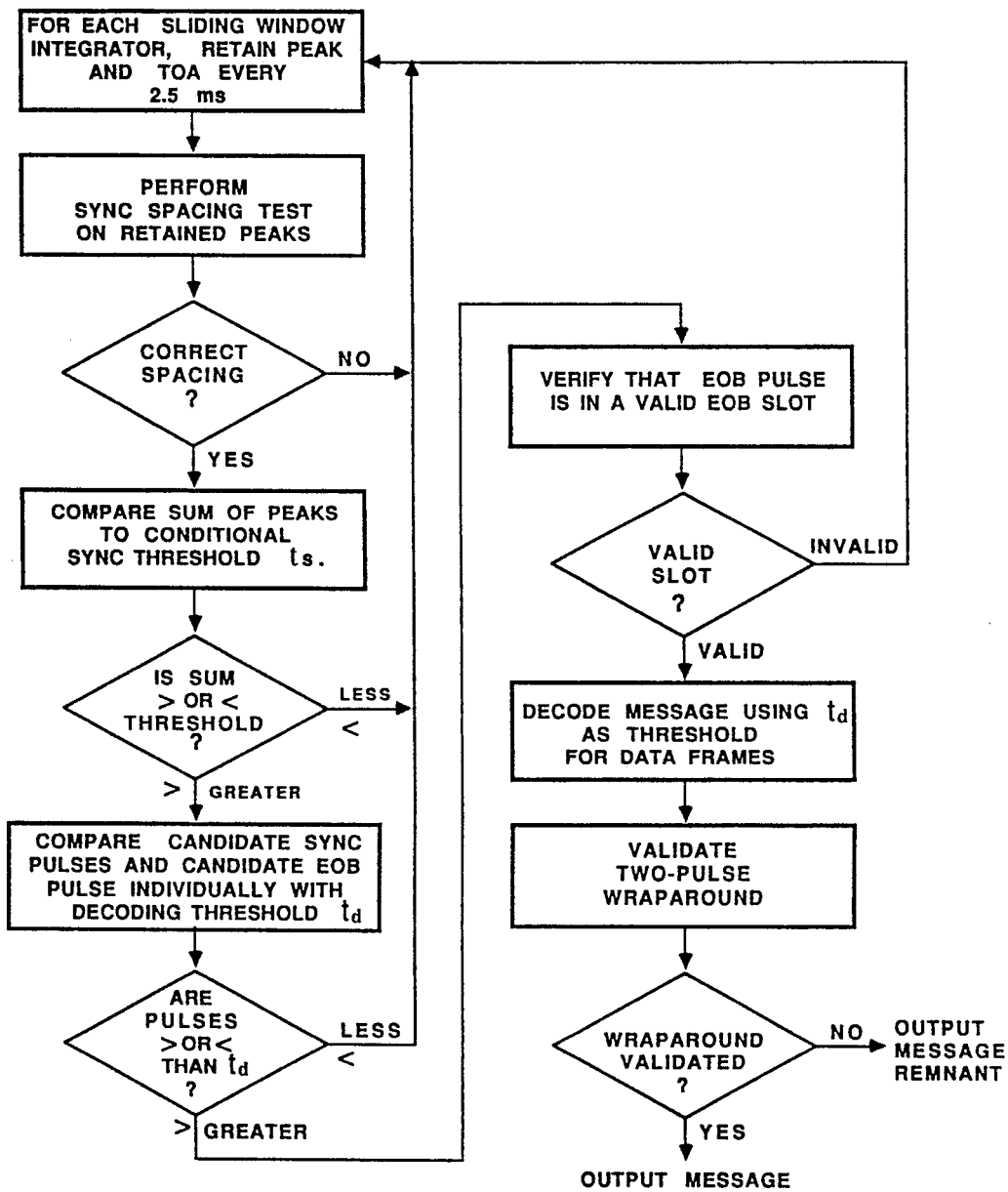
FIG. 12 is a block schematic diagram of the PPM decoding algorithm employed in the preferred embodiments of the present invention.

More specifically, decoder 645 (depicted in FIG. 10) accepts the PPM signals from digital filter 630, locates the synchronization/framing pulses, decodes the message, and transfers the message data to the operator terminal 60 for display and/or printout. To perform these functions it records in an internal buffer memory the peak amplitude and the TOA of all incoming pulses to extract the pulse position information. Since the message format is structured into frames $S_1$, $S_2$--, $S_{20}$) identified by periodic sync or framing pulses, the decoder and pulse analyzer trys to match the timing of any two consecutive pulses to that of the synchronizing pulses for the PPM format. Upon identifying the synchronizing pulses, decoder 645 proceeds to demodulate the coded message from the timing of the incoming pulses. The buffer memory has a sufficient number of registers to record at least several frames at a time. FIG. 12 is a flow chart illustrating the PPM decoding algorithm used in the signal decoder (645).

Receive Processor 612 performs all housekeeping functions within receiver 70 and routes and prioritizes all interfaces between the receiver and the operator terminal 60. The preferred embodiment of Receive Processor 612 is a 68020-based microcomputer card.

ERROR CORRECTION CODING

The following discussion of signal coding does not address how a transmission is formatted to establish the IFF code or what link information is sent with the message data; that discussion may be found in the next section dealing with power management of the uplink beam.

In order to achieve reliable communications, the receive bit error rate (BER) of both receivers must be less than $10^{-5}$, which requires an uncoded single pulse S/N of 19 dB. Without any redundant coding or error correction, this S/N of 19 dB on the uplink from operational depths requires ideal conditions during daytime hours given the transmit power and operational depth constraints stated earlier. At less than ideal conditions, such as very cloudy (stormy) weather, the required S/N cannot be achieved at operational submarine depths without greatly increasing transmitter power for a given receiver sensitivity. Therefore, some form of signal enhancement is required. Error correction or redundant coding of the uplink pulses is the answer. It can add up to 15 dB of signal improvement in this embodiment.

Without any error correction or receiver correlation techniques, the airborne receiver 40 will occasionally miss the uplink response, when the receive S/N is below 19 dB. To prevent this in one embodiment of the invention, the airborne signal processor 410 accumulates in a buffer register a sufficient number of responses in order to verify with high reliability that the submarine has, or has not, responded. For example, if the transmission proceeds at the preferred pulse rate of 40 pps in a prescribed sequence, e.g. an IFF code, then by accumulating pulses over 36 successive frames (for a total of 0.9 seconds), the receiver enhances the S/N by 15 dB. Thus an uplink signal with a S/N of 4 dB can be recovered and the IFF verified, by accumulating uplink pulse signals for approximately one second.

Once the communication link is established, the two platforms exchange messages by interleaving the uplink pulses with the downlink pulses when the same wavelength is used by both uplink and downlink lasers. Although both platforms have established before any transmission takes place which time slot is allocated to which transmitter, within each group of time slots (or frame) laser pulses are randomly distributed. Neither the uplink nor the downlink receiver has any apriori knowledge of the pulse timing for the message pulses it receives; if the S/N is low, errors in the message can occur. To correct these errors in the message mode, one of the several possible error correction codes is used. There are many possible such codes in use in the communication industry, for example, a Reed-Solomon error correction code with "soft" decision detection is routinely used for deep space communication systems. In addition, in one embodiment receiver 40 switches from a threshold detector to a highest "peak" detector for detecting the pulse within each frame (see FIG. 12). These bit error correction techniques are well known and widely used in the communication industry, and they have been demonstrated to extract the correct message from weak signals where the S/N is low.

IFF CODING AND POWER MANAGEMENT

It is extremely important for secure communication that the optical transmissions between the submarine and the aircraft have a low probability of interception/detection (LPI/LPD) by an adversary. There are four system constraints taken in the preferred embodiment of this nvention to maintain an LPI/LPD:

1. Aircraft transceiver 100 always initiates the communication. In this way the submarine never transmits emissions at random potentially revealing its position to an adversary.
2. The messages are communicated at a sufficiently high data rate (40 characters/second) so that most messages can be conveyed in ten seconds or less.
3. The submarine transmitter responds only to a verified IFF sequence. It does not respond to an arbitrary set of laser pulses even at the correct wavelength.
4. The uplink transmitter power is attenuated to the minimum power needed to convey the message to the aircraft.

Since items 1 and 2 have already been discussed, item 3, the IFF code will be addressed first. During the acquisition mode (where the aircraft seeks to establish contact with the submarine), the aircraft transmits a coded message which, when received, may automatically evoke a specific response from the submarine with the knowledge and consent of the submarine commander. That coded message. in the preferred embodiment of this invention, embodies the IFF code. For example, the aircraft may repeatedly transmit a sequence $S_n$ of 20 pulses $S_1, S_2$--, $S_{20}$) which are characterized by their time slot number n. Upon recognition of the correct downlink sequence, uplink transmitter 50 responds during the dead-time period of downlink transmitter 30 with a prearranged sequence (an uplink IFF code) precisely related in some way to the downlink sequence. The uplink transmitter may simply respond in the same slot as that of the downlink, it may have a more complicated code such as a progressive displacement of slots from that of the uplink, or it may preferably have some pseudo-random sequence; however, airborne receiver 40 knows apriori in which slot to expect the submarine's response.

The last and most important system constraint to minimize the probability of intercept is item 4, the uplink power management. This is a significant feature of our invention. Basically the TALC system limits the energy radiated in the uplink beam to the minimum level required to enable the airborne receiver to recover and decode the data with a reasonable level of S/N, i.e. 19 dB. Once the communication link is established between the two, the problem of how to adjust the uplink output power is greatly simplified. The airborne transceiver 100 merely transmits a command to the submerged transceiver 200 to either increase or decrease its uplink power. The proper power setting for the initial uplink transmission is a much more difficult problem. The submerged transceiver 200 must estimate the path losses and adjust its output power accordingly. However, without information concerning the weather and details about the airborne platform, any estimate would be little more than a guess. To enable the submerged transceiver 200 to estimate the path losses, transmitter 30 encodes the necessary link as supervisory data in the initial downlink transmission. Receiver 70 then decodes the transmitted link information enabling transmit controller 613 in conjunction with the operator terminal 60 to determine the minimum necessary power needed in the uplink beam to produce a 19 dB S/N at the airborne receiver 40. Transmit controller 613 then sets its transmitter to this energy level for the initial response transmission. Notwithstanding the seemingly simple process, uplink power management is a nontrivial engineering problem due to the many variables that may attenuate the laser beam over the communication link.

More specifically, using the decoded link parameters and the system characteristics stored in memory, the microcomputer in receiver processor 612 performs an initial calculation using validated propagation models to estimate the required transmit energy level. The input parameters to perform the calculation come from three sources: the aircraft, the submarine, and the submarine receiver. The airborne transceiver 100 encodes the following link and aircraft data: estimated cloud loss, radiated downlink power, scan mode (i.e., pushbroom or spot), spot size, scan angle, uplink receiver field-of-view and sensitivity, and the aircraft altitude above the last scattering surface. The signal format is structured such that there are some 320 bits of data in the IFF and preamble code during the acquisition stage (acquisition mode) of the communication, which is more than sufficient to accommodate both the IFF code and this data. The submarine can determine its own depth, time of day (i.e., day or night), and location which can be correlated with water attenuation data base. The submarine receiver can measure the background noise level, the received energy per pulse, and the pulse width. Having this information transceiver 200 has all the data needed to compute a best estimate of the uplink S/N at the aircraft receiver.

The downlink information includes the pulse energy from the airborne transmitter. The submarine compares the signal level measured in its receiver with the transmitter's signal level and estimates the signal attenuation (from all effects) between the aircraft and submarine.

To demonstrate the methodology of how processor 612 determines the proper transmit power setting, the following numerical example is provided which makes use of the equations and models for the propagation path, shown in Tables 1-6.

The example considered is for thick cloud daytime conditions. TABLES 1 and 2 list the uplink signal energy and uplink background equations. For this most difficult case, the problem s to estimate all the other parameters in this equation so that $E_t$, the transmitter pulse energy, can be correctly set to achieve a signal-to-noise of 19 dB at the airborne receiver.

TABLES 3 and 4 list the equivalent downlink signal and background equations. The received energy, the cloud-induced pulse width and the average background can all be measured at the submarine receiver, and used to estimate common parameters in the uplink equation in TABLE 1.

TABLE 5 lists the expression for the S/N and nose equivalent power. It is this expression which in the preferred embodiment must equal 19 dB (a numerical value of 8.91) for average uplink communication.

TABLE 6 summarizes the numerical data for this example. The estimation method for each parameter of TABLE 1 is presented, along with typical values. Given this methodology, the underwater processor 612 then calculates the uplink parameters: $P_b$, $NEP_b$, $E_r$ as a function of $E_t$, S/N as a function of $E_t$ and finally, the value of $E_t$ needed to achieve a S/N = 19 dB. For the example, $E_t = 0.525$ joule is needed. and if the underwater transmitter has a 1 joule output power capability, it must be attenuated by 2.8 dB.

Alternatively, if uplink message processing is appropriate (since shorter messages may be all that is required), a simple pulse integration scheme could be utilized. For example, if 16 pulses are used to convey the information normally contained in one pulse, the data rate is reduced by a fraction of $(16)^{-1}$ but the required value of $E_t$ is reduced by a value of $(16)^{-\frac{1}{2}}$. For the selected example, $E_t\rightarrow 0.131$ joule, a reduction of 8.8 dB from the 1 joule capability.

Once the transceiver 200 has determined the energy needed to produce the desired S/N at the airborne transceiver, transmit controller 613 in conjunction with the control electronics 505 (see FIG. 3) sets beam energy controller 502 to obtain the closest incremental value to the calculated energy level and then responds with the uplink communication.

CONTROLLING THE UPLINK BEAM POWER

Figure 13:
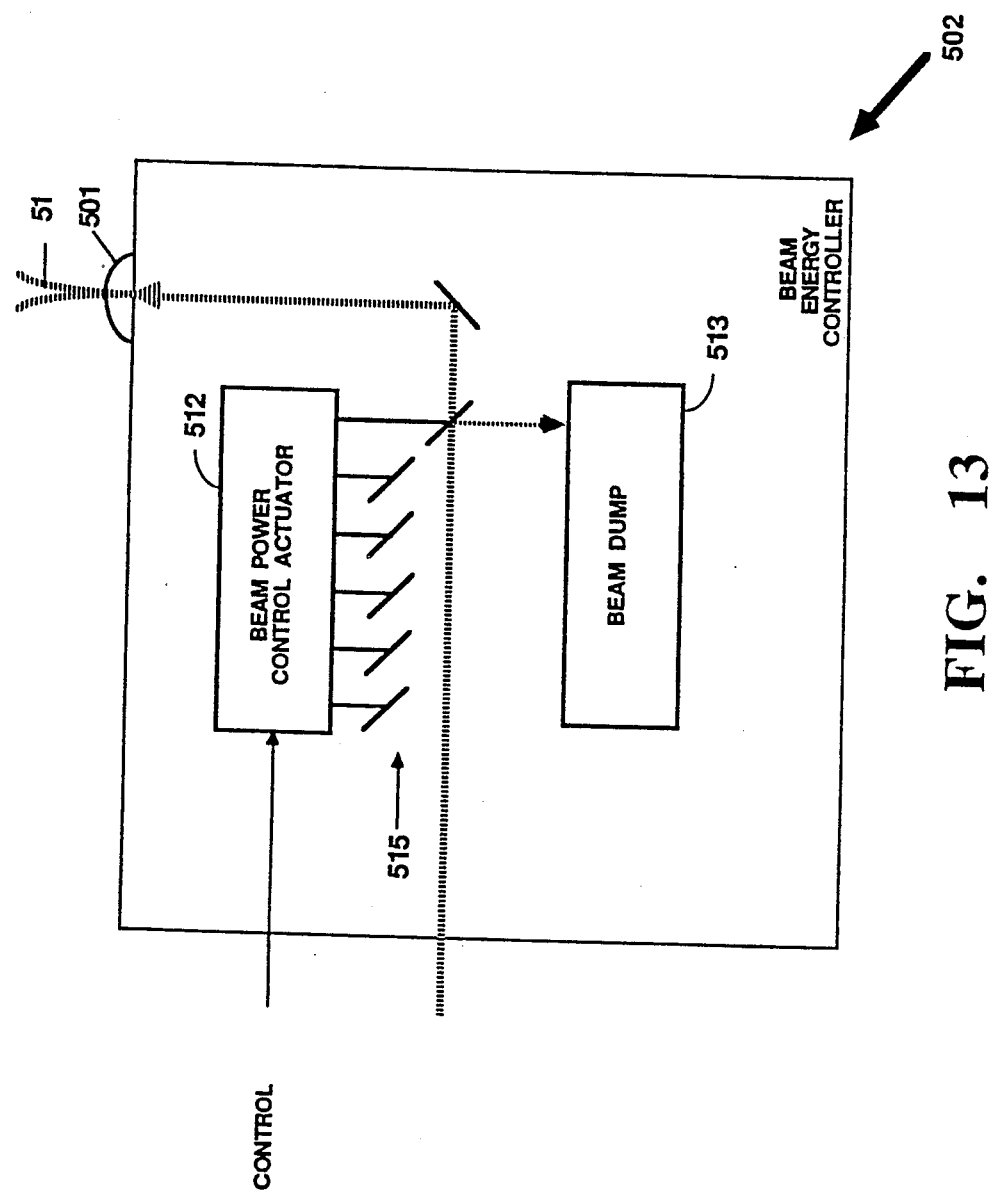
FIG. 13 is a detailed block diagram of the beam energy controller employed in the preferred embodiment of the submarine laser transmitter.

The uplink beam energy can be controlled over several orders of magnitude. In the preferred embodiment of transmitter 50, the transmitter consists of two or more modules which operate independently. The first step is to operate only one module. Referring to FIG. 13, the beam energy controller 502 consists of a series of six partially-reflecting mirrors 515 which can be inserted into the beam path upon command from the control electronics 505 (shown in FIG. 3). A mechanical actuator 512 inserts or withdraws one or more mirrors 515 into the beam path diverting a portion of beam 51 into an absorbing beam dump and heat sink 513 to remove the diverted power. The system transmits the unreflected portion of the attenuated beam out window 501 shown in FIG. 3.

During cloudy weather, daytime communication may require the full beam power on the uplink path in order to overcome the high background levels in airborne receiver 40. In clear weather the background light is much lower because less than 4% of the sun's light reflects from the surface and the uplink beam is much less attenuated so the uplink power can be reduced. At night the background drops by 50 to 60 dB, and the uplink beam power can be further reduced. For example, six reflectors each with 50% transmission can control the beam power from 1.0 to 0.015 joules, a range of 36.5 dB.

Using the above example to illustrate how the beam energy controller 502 would set the beam energy, controller 502 in FIG. 13 would insert two, 50% attenuators 515 into the uplink beam. Two 50% attenuators would reduce the energy to 0.25 joules per pulse, which would lower the S/N at the aircraft to 20 dB. This is within the desired range for the communication link. Alternatively, for a two-beam system (the preferred embodiment) one beam would be turned off and the other 50% attenuator 515 would be inserted into the beam path.

Once the calculated energy level is set and laser 503 commences transmission, the airborne transceiver 100 actually measures the received energy level and the S/N of the initial uplink beam transmission and, thereby, determines whether the attenuation setting of controller 502 is too high or too low. Any correction needed is encoded as link supervisory data and is added to the downlink message information. When receiver 70 detects and decodes the link supervisory data, transmit controller 613 makes an immediate corresponding correction in the attenuation setting of beam controller 502. This link management technique has the advantage of being responsive to changes in environmental conditions.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example there may be conditions of high danger where the submarine should not respond at all, or other conditions when it should only acknowledge receipt of the transmission. An appropriate code could be inserted with the IFF code to warn the submarine of imminent danger. Alternatively, a downlink code could be sent which indicates moderate danger with a planned rendezvous X minutes later at the same location or at a different designated location.

It will be equally apparent to those skilled in the art that although the term "submarine" has been used throughout to indicate the preferred application for the secure laser communication system, there is no reason that the airborne platform could not communicate with other submerged platforms, such as underwater listening devices, mines, etc. The airborne platform could activate, deactivate or simply interrogate the underwater device providing the device is equipped with an appropriate laser transceiver as described herein. It may be equally apparent that the term "airborne platform" also should be interpreted generally. For example it is possible given the practical power levels discussed herein to communicate from either high-altitude airborne platforms or low-orbit satellites providing that the user is willing to restrict periods of use to avoid certain inoperable periods or conditions, such as very heavy cloud cover conditions.

TABLE 1

UPLINK SIGNAL $$E_r = E_t \cdot T_t \cdot T_w \cdot T_s \cdot T_a \cdot T_c \cdot \frac{\lambda_b}{\lambda_r} \cdot T_r \cdot A_r \cdot \frac{\cos^3\alpha}{\pi(H')^2}$$

where:
| | | |
|---|---|---|
| $E_r$ | = | Energy received per pulse |
| $E_t$ | = | Transmitter pulse energy |
| $T_t$ | = | Transmission through the transmitter |
| $T_w$ | = | Transmission through the ocean water |
| $T_s$ | = | Transmission through the surface of the ocean |
| $T_a$ | = | Transmission through the atmosphere |
| $T_c$ | = | Transmission through the clouds (if any) |
| $\frac{\lambda_b}{\lambda_r}$ | = | Flux conversion factor from blue to red photons |
| $T_r$ | = | Transmission through the receiver |
| $A_r$ | = | Area of the receiver aperture |
| $H'$ | = | Orthogonal distance, aircraft to cloud top or water surface |
| $\alpha$ | = | Scan angle of airborne receiver, measured from nadir. |

TABLE 2

UPLINK BACKGROUND, DAYTIME $$P_b = N(\lambda) \cdot [(e^{-.357sec z} + 0.1)] \cdot R_s \cdot T_a \cdot$$

$$\frac{\lambda_b}{\lambda_r} \cdot B_o \cdot T_r \cdot A_r \cdot \pi[2(1 - \cos\theta_r)][\cos\alpha + 0.1]$$

where:
| | | |
|---|---|---|
| $P_b$ | = | Background power in the receiver |
| $N(\lambda)$ | = | Exo-atmospheric solar irradiance |
| $e^{-.357sec z} + 0.1$ | = | Transmission from top of atmosphere |

TABLE 2-continued
UPLINK BACKGROUND, DAYTIME

|   |   |   |
|---|---|---|
|   |   | to cloud top |
| z | = | Zenith angle of sun |
| $R_s$ | = | Reflectivity of the cloud or water surface |
| $T_a$ | = | Transmission through the atmosphere, cloud top or water surface to aircraft |
| $\frac{\lambda_b}{\lambda_r}$ | = | Flux conversion factor from blue to red photons |
| $B_o$ | = | Optical bandwidth of the receiver |
| $T_r$ | = | Transmission through the receiver |
| $A_r$ | = | Area of the receiver aperture |
| $\theta_r$ | = | Receiver field-of-view half-angle |

TABLE 3
DOWNLINK SIGNAL $$E_r = E_t \cdot T_t \cdot T_a \cdot T_c \cdot T_s \cdot T_w \cdot \frac{\lambda_b}{\lambda_r} \cdot T_r \cdot \frac{A_r}{A_s}$$

where:

| | | |
|---|---|---|
| $E_r$ | = | Energy received per pulse |
| $E_t$ | = | Transmitter pulse energy |
| $T_t$ | = | Transmission through the transmitter |
| $T_a$ | = | Transmission through the atmosphere |
| $T_c$ | = | Transmission through the clouds |
| $T_s$ | = | Transmission through the surface |
| $T_w$ | = | Transmission through the water |
| $\frac{\lambda_b}{\lambda_r}$ | = | Flux conversion factor from blue to red photons |
| $T_r$ | = | Transmission through the receiver |
| $A_r$ | = | Area of the receiver |
| $A_s$ | = | Beam spot area on the ocean's surface |

TABLE 4
DOWNLINK BACKGROUND $$P_b = N(\lambda) \cdot (e^{-.357secz} + 0.1) \cdot T_c \cdot T_s \cdot T_w \cdot \frac{\lambda_b}{\lambda_r} \cdot B_0 \cdot T_r \cdot A_r$$

TABLE 4-continued
DOWNLINK BACKGROUND where:

| | | |
|---|---|---|
| $P_b$ | = | Background power in the receiver |
| $N(\lambda)$ | = | Exo-atmospheric solar irradiance |
| $e^{-.357secz} + 0.1$ | = | Sun's zenith angle dependance through the atmosphere |
| z | = | Zenith angle of sun |
| $T_c$ | = | Transmission through the clouds |
| $T_s$ | = | Transmission through the surface |
| $T_w$ | = | Transmission through the water |
| $\frac{\lambda_b}{\lambda_r}$ | = | Flux conversions factor blue to red photons |
| $B_o$ | = | Receiver optical bandwidth |
| $T_r$ | = | Transmission through receiver |
| $A_r$ | = | Area of the receiver |

TABLE 5
BACKGROUND LIMITED SIGNAL TO NOISE RATIO $$\frac{S}{N} = \left(\frac{E_r}{\Delta t}\right)\left(\frac{1}{(NEP)_B}\right)$$

Where $$(NEP)_B = \left(\frac{2e\, Be\, P_b}{ne/h\nu}\right)^{\frac{1}{2}}$$

| | | |
|---|---|---|
| $\Delta t$ | = | Received pulse width. |
| e | = | Charge on the electron. |
| Be | = | Electrical detection bandwidth = $\frac{0.4}{\Delta t}$ |
| n | = | Photo-cathode quantum efficiency. |
| $h\nu$ | = | Energy per detected photon, and |

$$dB \text{ is defined as } 20 \log_{10}\left(\frac{S}{N}\right)$$

TABLE 6
UPLINK PARAMETERS/ESTIMATION/EXAMPLE EVALUATION

| PARAMETERS | ESTIMATED HOW | EXAMPLE VALUE |
|---|---|---|
| $E_t$ | Set by submarine from estimation | See below |
| $T_t$ | Known equipment constant | 0.9 |
| $T_w$ | Measured $E_r$ pulsewidth, known depth & aircraft sent downlink beam parameters | 0.01 |
| $T_s$ | Physical parameters, known from index of refraction mismatch | 0.83 |
| $T_a$ | Sent by aircraft or estimated from H' & $\alpha$ | 0.8 |
| $T_c$ | Estimated from receiver pulsewidth & downlink received energy, or sent by aircraft | 0.1 |
| $\frac{\lambda_b}{\lambda_r}$ | Known cesium filter factor | 0.524 |
| $T_r$ | Known receiver constant | 0.3 |
| $A_r$ | Known receiver constant | 0.05 m² |
| $\alpha$ | Sent by aircraft, as a function of time (for spotscan receiver) | 20° at time of response |
| H' | Sent by aircraft | 3048 m |
| $N(\lambda)$ | Physical constant | 0.2 watts/m² Å |
| $e^{-.357secz} + 0.1$ | Estimated from time of day, latitude and longitude | 0.76 for z = 30° |
| $R_s$ | Sent by aircraft, or estimated from cloud thickness | 0.8 |
| $B_o$ | Cesium filter constant | 0.05 Å |
| $\Theta_r$ | Sent by aircraft | 15° |
| $\Delta t$ | Measured on downlink, or estimated & sent by aircraft | 10 micro-seconds |
| e | Physical constant | 1.6 (10⁻¹⁹) coulombs |
| n | Known receiver parameter | 0.25 |
| $h\nu$ | Physical constant for cesium filter | 2.29 (10⁻¹⁹) joules |
| $P_b$ | Calculated in submarine, or measured & sent by aircraft | 8.51 (10⁻⁶) watts |
| $NEP_b$ | Calculated in submarine, or measured & sent by aircraft | 7.9 (10⁻¹⁰) watts |
| $E_r$ | Calculated in submarine | 1.34 (10⁻¹⁸) $E_t$ joules |
| S/N | Calculated in submarine | 17 $E_t$ |
| $E_t$ | Calculated & set in submarine for S/N = 19 dB (8.9125) | 0.525 joules |

What is claimed is:

1. A method of providing secure two-way communications between a submerged platform in an ocean and an airborne platform travelling above the ocean, said method comprising the steps of:

generating at the airborne platform a downlink beam comprising a first pulse-modulated laser beam having a blue-green wavelength $\lambda_1$ and having encoded therein downlink information, said information comprising:
(i) a predetermined downlink IFF code for use at least during an acquisition mode during which the airborne platform seeks to establish two-way communications with the submerged platform, and
(ii) supervisory data, for use during said acquisition mode and during a communicating mode during which two-way communications take place between the airborne platform and the submerged platform;

downwardly transmitting said downlink beam while controlling its divergence and pointing angle, such that during said acquisition mode said downlink beam has an elongated elliptically-shaped cross-sectional pattern with a wide dimension transverse to the direction of travel of the airborne platform and a narrow dimension parallel to the direction of travel of the airborne platform;

optically sensing at the submerged platform during a standby operating mode corresponding to said acquisition mode for the presence of said downlink beam, and at the end of said standby operating mode optically receiving said downlink beam from the airborne platform;

filtering said received downlink beam through an optical filter having a very narrow passband centered at the wavelength $\lambda_1$ to suppress any background radiation;

converting said filtered downlink beam into first electrical pulses;

decoding said electrical pulses and outputting said downlink information;

verifying said predetermined downlink IFF code in said downlink information, said standby operating mode ending upon such verification;

generating, in response to said verified IFF code, an uplink beam comprising a second pulse-modulated laser beam having a wavelength $\lambda_1$ and having encoded therein uplink information, said information including an uplink IFF code to acknowledge receiving said downlink beam;

adjusting the uplink beam power in response to said supervisory data contained in said decoded downlink information;

upwardly transmitting said uplink beam to said airborne platform;

optically scanning at the airborne platform during said acquisition mode, a spatial area using a variable field of view to detect the presence of said uplink beam, and during said communicating mode, optically receiving said uplink beam from a substantially stationary spatial location;

filtering said received uplink beam through an atomic resonant filter having a very narrow passband centered at the wavelength $\lambda_1$ thereby greatly attenuating any background radiation;

converting said filtered uplink beam into second electrical pulses;

decoding said second electrical pulses and outputting said uplink information;

verifying said uplink IFF code in said uplink information; and generating a correction signal related to the S/N of said received uplink beam, said correction signal being added to said supervisory data for encoding therewith.

2. A method of providing secure communications as defined in claim 1 wherein said airborne optically receiving step further comprises varying said field of view to maximize the received S/N.

3. A method of providing secure communications as defined in claim 2 further characterized by the step of periodically repeating said adjusting step in response to said correction signal from the airborne platform so as to maintain said S/N substantially at a predetermined number.

4. A method of providing secure communications as defined in claim 3 wherein said second generating step continues only so long as said downlink beam is received at the submerged platform.

5. A method of providing secure communications as defined in claim 4 wherein both of said generating steps pulse-position modulate said first and second pulse-modulated laser beams, respectively.

6. A method of providing secure communications as defined in claim 5 wherein said uplink IFF code and said downlink IFF code are different codes.

7. A method of providing secure communications as defined in claim 6 wherein said uplink IFF code is determined by said downlink IFF code.

8. A method of providing secure communications as defined in claim 7 wherein said downwardly transmitting step sets the divergence of said downlink beam to have an elongated elliptically-shaped cross-sectional pattern during said acquisition mode and during said communicating mode.

9. A method of providing secure communications as defined in claim 8 wherein said upwardly transmitting step is timed to interleave light pulses in said uplink beam with light pulses in said downlink beam.

10. A method of providing secure communications as defined in claim 3 wherein said predetermined value of S/N is 19 dB.

11. A method of providing secure communications as defined in claim 1 wherein said first generating step ceases in response to said verified uplink IFF code and said second generating step continues for a predetermined period of time.

12. A method of providing secure communications as defined in claim 11 wherein said atomic resonant filter uses a Cesium gas cell to convert incoming photons at said $\lambda_1$ wavelength to NIR photons.

13. A method of providing secure two-way communications between a submarine submerged in an ocean and an airborne platform travelling above the ocean, said method comprising the steps of:

generating at the airborne platform a downlink beam comprising a first pulse-modulated laser beam having a blue-green wavelength $\lambda_1$ and having encoded therein downlink information, said information comprising:
(i) a predetermined downlink IFF code for use at least during an acquisition mode during which the airborne platform seeks to establish two-way communications with the submarine, and (ii) supervisory data, for use during said acquisition mode during a communicating mode during which two-way communications take place between the airborne platform and the submarine; downwardly transmitting from the airborne platform said downlink beam while controlling its divergence and pointing angle, such that:

(i) during said acquisition mode, said downlink beam has an elongated elliptically-shaped cross-sectional pattern with a wide dimension transverse to the direction of travel of the airborne platform and a narrow dimension parallel to the direction of travel of the airborne platform, and (ii) during said communicating mode, said downlink beam has a substantially circular cross-sectional spot pattern with said beam axis pointing at a substantially fixed terrestial location, optically sensing at the submarine for the presence of said downlink beam during said acquisition mode, and optically receiving said downlink beam during said communicating mode;

filtering said received downlink beam through a first atomic resonant filter having a very narrow passband centered at the wavelength $\lambda_1$ thereby greatly attenuating any background radiation;

converting said filtered beam into first electrical pulses;

decoding said first electrical pulses and outputting said downlink information;

verifying said predetermined downlink IFF code in said downlink information;

generating, in response to said verified downlink IFF code, an uplink beam comprising a second pulse-modulated laser beam having a wavelength $\lambda_1$ and having encoded therein uplink information, said information including an uplink IFF code to acknowledge receiving said downlink beam;

adjusting the uplink beam power in response to said supervisory data contained in said decoded downlink information to limit the amount of power radiated beyond the airborne platform;

upwardly transmitting said uplink beam to said airborne platform;

optically scanning at the airborne platform a spatial area using a variable field of view to detect the presence of said uplink beam during said acquisition mode, and optically receiving said uplink beam from a substantially stationary terrestial location during said communicating mode;

filtering said received uplink beam through a second atomic resonant filter having a very narrow passband centered at the wavelength $\lambda_1$ thereby greatly attenuating any background radiation;

converting said filtered uplink beam into second electrical pulses;

decoding said second electrical pulses and outputting said uplink information;

verifying said uplink IFF code in said uplink information; and generating a correction signal related to the S/N of said received uplink beam, said correction signal being added to said supervisory data for encoding therewith.

14. A method of providing communications as defined in claim 13 wherein said upwardly transmitting step is timed to interleave light pulses in said uplink beam with light pulses in said downlink beam.

15. A method of providing communications as defined in claim 14 further characterized by the step of periodically repeating said adjusting step in response to each new correction signal from the airborne platform so as to maintain said S/N substantially at a predetermined number.

16. A method of providing communications as defined in claim 15 wherein said airborne optically receiving step further comprises tracking said uplink laser beam using a variable field of view to maximize the received S/N.

17. A method of providing communications as defined in claim 16 wherein said second generating step continues only so long as said downlink beam is received at the submarine.

18. A method of providing communications as defined in claim 17 wherein both of said generating steps pulse-position modulate said first and second pulse-modulated laser beams, respectively.

19. A method of providing communications as defined in claim 18 wherein said uplink IFF code is determined by said downlink IFF code.

20. A method of providing communications as defined in claim 19 wherein said predetermined value of S/N is 19 dB.

21. A method of providing communications as defined in claim 20 wherein said spatial area being scanned by the airborne platform is offset from said downlink beam pattern during said acquisition mode.

22. A method of providing communications as defined in claim 21 wherein said wavelength $\lambda_1$ is matched to the filter absorption line of said first atomic resonant filter.

23. A method of providing secure two-way communications between a submarine submerged in an ocean and an airborne platform travelling above the ocean, said method comprising the steps of:

generating at the airborne platform a downlink beam comprising a first pulse-modulated laser beam having a blue-green wavelength $\lambda_1$ and having encoded therein downlink information, said information comprising:

(i) a predetermined downlink IFF code for use at least during an acquisition mode during which the airborne platform seeks to establish two-way communications with the submarine, and (ii) supervisory data, for use during said acquisition mode and during a communicating mode during which two-way communications take place between the airborne platform and the submarine;

downwardly transmitting from the airborne platform said downlink beam while controlling its divergence and pointing angle to produce an elongated elliptically-shaped cross-sectional beam pattern with a wide dimension transverse to the direction of travel of the airborne platform and a narrow dimension parallel to the direction of travel of said platform, and with a central beam axis intersecting the center of said beam pattern, said central beam axis pointing at a relatively fixed terrestial location during said communicating mode;

optically sensing at the submarine for the presence of said downlink beam from the airborne platform during said acquisition mode, and optically receiving said downlink beam from the airborne platform during said communicating mode;

filtering said received downlink beam through a first atomic resonant filter having a very narrow passband centered at the wavelength $\lambda_1$ thereby greatly attenuating any background radiation;

converting said filtered beam into first electrical pulses;

decoding said first electrical pulses and outputting said downlink information;

verifying said predetermined downlink IFF code in said downlink information;

generating, in response to said verified downlink IFF code, an uplink beam comprising a second pulse-modulated laser beam having a wavelength $\lambda_1$ and having encoded therein uplink information, said information including an uplink IFF code to acknowledge receiving said downlink beam;

adjusting the uplink beam power in response to said supervisory data contained in said decoded downlink information to limit the amount of power radiated beyond the airborne platform;

upwardly transmitting said uplink beam to said airborne platform;

optically scanning at the airborne platform a spatial area using a variable field of view to detect the presence of said uplink beam during said acquisition mode, and optically receiving said uplink beam from a substantially stationary terrestial location during said communicating mode;

filtering said received uplink beam through a second atomic resonant filter having a very narrow passband centered at the wavelength $\lambda_1$ thereby greatly attenuating any background radiation;

converting said filtered uplink beam into second electrical pulses;

decoding said second electrical pulses and outputting said uplink information;

verifying said uplink IFF code in said uplink information; and generating a correction signal related to the S/N of said received uplink beam, said correction signal being added to said supervisory data for encoding therewith.

24. A method of providing communications as defined in claim 23 wherein said upwardly transmitting step is timed to interleave light pulses in said uplink beam with light pulses in said downlink beam.

25. A method of providing communications as defined in claim 24 further characterized by the step of
periodically repeating said adjusting step in response to each new correction signal from the airborne platform so as to maintain said S/N substantially at a predetermined number.

26. A method of providing communications as defined in claim 25 wherein said airborne optically receiving step further comprises tracking said uplink laser beam using a variable field of view to maximize the received S/N.

27. A method of providing communications as defined in claim 26 wherein said second generating step continues only so long as said downlink beam is received at the submarine.

28. A method of providing communications as defined in claim 27 wherein both of said generating steps pulse-position modulate said first and second pulse-modulated laser beams, respectively.

29. A method of providing communications as defined in claim 28 wherein said uplink IFF code is determined by said downlink IFF code.

30. A method of providing communications as defined in claim 29 wherein said predetermined value of S/N is 19 dB.

31. A method of providing communications as defined in claim 30 wherein said spatial area being scanned by the airborne platform is offset from said downlink beam pattern during said acquisition mode.

32. A method of providing communications as defined in claim 31 wherein said wavelength $\lambda_1$ is matched to the filter absorption line of said first atomic resonant filter.

33. A method of providing secure two-way communications between a submarine submerged in an ocean and an airborne platform travelling above the ocean, said method comprising the steps of:

generating at the airborne platform a downlink beam comprising a first pulse-modulated laser beam having a blue-green wavelength $\lambda_1$ and having encoded therein downlink information, said information comprising:
  (i) a predetermined downlink IFF code for use at least during an acquisition mode during which the airborne platform seeks to establish two-way communications with the submarine, and
  (ii) supervisory data, for use during said acquisition mode and during a communicating mode during which two-way communications may take place between the airborne platform and the submarine;

downwardly transmitting from the airborne platform said downlink beam while controlling its pointing angle from said airborne platform, such that during said acquisition mode said downlink beam scans from side-to-side transverse to the direction of travel of said platform, and during said communicating mode downlink beam points at a relatively fixed terrestial location on said ocean;

optically sensing at the submarine for the presence of said downlink beam from the airborne platform during said acquisition mode, and optically receiving said downlink beam from the airborne platform during said communicating mode;

filtering said received downlink beam through a first atomic resonant filter having a very narrow passband centered at the wavelength $\lambda_1$ thereby greatly attenuating any background radiation;

converting said filtered beam into first electrical pulses;

decoding said first electrical pulses and outputting said downlink information;

verifying said predetermined downlink IFF code in said downlink information;

generating, in response to said verified downlink IFF code, an uplink beam comprising a second pulse-modulated laser beam having a wavelength $\lambda_1$ and having encoded therein uplink information, said information including an uplink IFF code to acknowledge receiving said downlink beam;

adjusting the uplink beam power in response to said supervisory data contained in said decoded downlink information to limit the amount of power radiated beyond the airborne platform;

upwardly transmitting said uplink beam to said airborne platform;

optically scanning at the airborne platform a spatial area using a variable field of view to detect the presence of said uplink beam during said acquisition mode, and optically receiving said uplink beam from a substantially stationary terrestrial location during said communicating mode; filtering said received uplink beam through a second atomic resonant filter having a very narrow passband centered at the wavelength $\lambda_1$ thereby greatly attenuating any background radiation;

converting said filtered uplink beam into second electrical pulses;

decoding said second electrical pulses and outputting said uplink information;

verifying said uplink IFF code in said uplink information; and generating a correction signal related to the S/N of said received uplink beam, said correction signal being added to said supervisory data for encoding therewith.

34. A method of providing secure communications as defined in claim 33 wherein said upwardly transmitting step time-interleaves light pulses in said uplink beam with light pulses in said downlink beam.

35. A method of providing secure communications as defined in claim 34 further characterized by the step of
periodically repeating said adjusting step in response to each new correction signal from the airborne platform so as to maintain said airborne platform S/N substantially at a predetermined number.

36. A method of providing secure communications as defined in claim 35 wherein said airborne optically scanning step further comprises:

during said acquisition mode, scanning the ocean surface using a field of view somewhat larger than the downlink beam spot and behind that of said downlink beam to allow for a delay in said uplink beam response from the submarine;

during the communication mode, optically tracking the uplink beam using a field of view which matches the uplink beam spot size on the ocean surface.

37. A method of providing secure communications as defined in claim 36 wherein said downwardly transmitting step points said downlink beam during said communicating mode at a relatively fixed terrestial location defined by the area on the ocean surface from which said uplink beam emerges.

38. A method of providing secure communications as defined in claim 37 wherein said second generating step continues only so long as said downlink beam is received at the submarine.

39. A method of providing secure communications as defined in claim 37 wherein both of said generating steps pulse-position modulate said first and second pulse-modulated laser beams, respectively.

40. A method of providing secure communications as defined in claim 39 wherein said uplink IFF code is determined by said downlink IFF code.

41. A method of providing secure communications as defined in claim 40 wherein said predetermined value of S/N is 19 dB.

42. A method of providing secure communications as defined in claim 41 wherein said wavelength $\lambda_1$ is matched to the filter absorption line of said first atomic resonant filter.

43. A method of providing secure communications as defined in claim 42 wherein said $\lambda_1$ wavelength is approximately 455 nm.

44. A method of providing a secure duplex communication link between a submerged submarine in an ocean and an airborne platform travelling above the ocean in the general vicinity of the submarine, said method comprising the steps of:

signalling the submarine that the airborne platform is in an acquisition mode seeking to establish the communication link, said signalling step comprising the steps of:

generating at the airborne platform a downlink beam comprising a first pulse-position modulated laser beam having a very stable blue-green wavelength $\lambda_1$ and having encoded therein downlink information, said information comprising: (i) a predetermined downlink IFF code identifying the airborne platform to the submarine and (ii) supervisory data;

downwardly transmitting from the airborne platform said downlink beam while controlling its divergence and pointing angle, such that said downlink beam has an elongated elliptically-shaped cross-sectional pattern with a wide dimension transverse to the direction of travel of the airborne platform and a narrow dimension parallel to the direction of travel of the airborne platform;

receiving at the submarine said downlink beam and signalling the airborne platform that the submarine is ready to begin communications, said receiving and signalling comprising the steps of:

collecting light from above the submarine including said downlink beam when said airborne platform is within range of said submarine;

filtering said collected light through first atomic resonant filter having a passband centered at the wavelength $\lambda_1$ to reject any background radiation;

converting said filtered light into first electrical pulses;

decoding said first electrical pulses and outputting said downlink information;

verifying said predetermined downlink IFF code in said downlink information;

generating in response to said verified downlink IFF code, an uplink beam comprising a second pulse-position modulated laser beam having a very stable wavelength $\lambda_1$ and having encoded therein uplink information including an uplink IFF code related to said downlink IFF code in a predetermined manner, said uplink beam having light pulses timed to be interleaved with light pulses in said downlink beam;

upwardly transmitting said uplink beam to said airborne platform using a radiated power level in response to said decoded supervisory data;

receiving at the airborne platform said uplink beam and acknowledging same, said receiving and acknowledging comprising the steps of:

optically scanning a spatial area below the airborne platform using a field of view periodically traversing said direction of travel to detect the presence of said uplink beam, and upon detection thereof, optically tracking said uplink beam from a substantially stationary spatial location using a field of view which maximizes the received S/N;

filtering said uplink beam through a second atomic resonant filter having a very narrow passband centered at the wavelength $\lambda_1$ thereby greatly attenuating any background radiation;

converting said filtered uplink beam into second electrical pulses;

decoding said second electrical pulses and outputting said uplink information;

verifying said uplink IFF code in said uplink information;

generating a correction signal related to the S/N of said received uplink beam, said correction signal being added to said supervisory data for encoding in said downlink beam;

modifying the divergence and pointing angle of said downlink beam such that said downlink beam has a substantially circular cross-sectional spot pattern with a beam axis pointing at a substantially fixed terrestial location; encoding message data in said downlink beam in place of said downlink IFF code.

* * * * *